(12) United States Patent
Gensemer et al.

(10) Patent No.: US 11,022,494 B2
(45) Date of Patent: Jun. 1, 2021

(54) APPARATUS FOR MEASURING SPECTRA

(71) Applicant: Commonwealth Scientific and Industrial Research Organisation, Australian Capital Territory (AU)

(72) Inventors: Stephen Gensemer, Australian Capital Territory (AU); Tim Malthus, Australian Capital Territory (AU)

(73) Assignee: Commonwealth Scientific and Indsutrial Research Organisation, Acton (AU)

( * ) Notice: Subject to any disclaimer, the term of this patent is extended or adjusted under 35 U.S.C. 154(b) by 220 days.

(21) Appl. No.: 16/317,423

(22) PCT Filed: Jul. 11, 2017

(86) PCT No.: PCT/AU2017/050711
§ 371 (c)(1),
(2) Date: Jan. 11, 2019

(87) PCT Pub. No.: WO2018/009967
PCT Pub. Date: Jan. 18, 2018

(65) Prior Publication Data
US 2019/0277695 A1 Sep. 12, 2019

(30) Foreign Application Priority Data
Jul. 14, 2016 (AU) .................. 2016902770

(51) Int. Cl.
*G01J 3/42* (2006.01)
*G01J 3/18* (2006.01)
(Continued)

(52) U.S. Cl.
CPC .............. *G01J 3/42* (2013.01); *G01J 3/0221* (2013.01); *G01J 3/18* (2013.01); *G01J 3/28* (2013.01);
(Continued)

(58) Field of Classification Search
CPC .... G01J 3/0221; G01J 3/42; G01J 3/46; G01J 3/48; G01J 3/2823; G01N 21/274
See application file for complete search history.

(56) References Cited

U.S. PATENT DOCUMENTS 3,619,624 A 11/1971 Sorenson
4,259,014 A 3/1981 Talmi
(Continued)

FOREIGN PATENT DOCUMENTS

CN 2042-14770 U 3/2015
CN 204214770 U 3/2015
(Continued)

OTHER PUBLICATIONS

Laser Focus Word editors, "Mini spectrometer from Horiba Scientifc provides 500:1 signal-to-noise ratio" https://www.laserfocusworld.com/...troscopy/article/16560647/mini-spectrometer-from-horiba-scientific-provides-5001-signaltonoise-ratio Mar. 27, 2013 hereafter Laser Focus World editors (Year: 2013).*
(Continued)

*Primary Examiner* — Maurice C Smith
(74) *Attorney, Agent, or Firm* — Kilpatrick Townsend & Stockton LLP

(57) ABSTRACT

Apparatus for measuring spectra from one or more samples, the apparatus including a reference waveguide that receives illuminating radiation used to illuminate at least one sample, at least one sample waveguide that receives sample radiation at least one of reflected from and transmitted through a respective sample, an optical system that spatially distributes radiation from each of the waveguides based on a frequency of the radiation, and focuses radiation from the optical fibres into an imaging plane and an imaging device that captures an image of the focused and spatially distrib-
(Continued)

uted radiation from the imaging plane so that the image includes respective spectra from each of the waveguides.

20 Claims, 21 Drawing Sheets

(51) Int. Cl.
  *G01J 3/28* (2006.01)
  *G01J 3/02* (2006.01)
  *G01N 21/25* (2006.01)
  *G01N 21/31* (2006.01)

(52) U.S. Cl.
  CPC .......... *G01J 3/2823* (2013.01); *G01N 21/253* (2013.01); *G01N 21/251* (2013.01); *G01N 21/31* (2013.01); *G01N 2201/08* (2013.01); *G01N 2201/082* (2013.01); *G01N 2201/084* (2013.01)

(56) References Cited

U.S. PATENT DOCUMENTS

| | | | |
|---|---|---|---|
| 4,416,542 A | 11/1983 | Mooradian | |
| 4,705,396 A | 11/1987 | Bergstrom | |
| 5,754,722 A | 5/1998 | Melling | |
| 5,880,834 A | 3/1999 | Chrisp | |
| 7,209,230 B2 | 4/2007 | Odhner | |
| 7,817,274 B2 | 10/2010 | Zhang | |
| 8,767,205 B2 | 7/2014 | Johnsen | |
| 8,917,391 B2* | 12/2014 | Elliott | G06F 3/017 356/328 |
| 9,470,579 B2* | 10/2016 | Ritter | G01J 3/2823 |
| 10,753,860 B2* | 8/2020 | Murakami | G01N 21/3563 |
| 2004/0130713 A1 | 7/2004 | O'Mongain | |
| 2004/0195511 A1 | 10/2004 | Elmore et al. | |
| 2007/0127027 A1 | 6/2007 | Kralik et al. | |
| 2007/0205379 A1 | 9/2007 | Nelson et al. | |
| 2008/0316468 A1 | 12/2008 | Treado et al. | |
| 2009/0231578 A1 | 9/2009 | Ling et al. | |
| 2013/0168301 A1 | 7/2013 | Dell'Endice et al. | |
| 2014/0022381 A1* | 1/2014 | Heinold | G01J 3/2803 348/135 |
| 2015/0233763 A1* | 8/2015 | Holub | G01J 3/462 348/184 |

FOREIGN PATENT DOCUMENTS

| | | |
|---|---|---|
| EP | 2703794 A1 | 3/2014 |
| WO | 2006-023712 A2 | 3/2006 |
| WO | 2018-009967 A1 | 1/2018 |

OTHER PUBLICATIONS

European Search Report and Written Opinion dated Jan. 24, 2020 in European Patent Application No. 17826678.9, 8 pages.

Shadmehr, R., et al., 'Principal Component Analysis of Optical Emission Spectroscopy and Mass Spectrometry: Application to Reactive Ion Etch Process Parameter Estimation Using Neural Networks', Journal of the Electrochemical Society, Mar. 1992, vol. 139, No. 3, pp. 907-914.

International Search Report for International Application No. PCT/AU/2017/050711, dated Sep. 4, 2017, all pages.

* cited by examiner

APPARATUS FOR MEASURING SPECTRA

BACKGROUND OF THE INVENTION

The present invention relates to an apparatus for measuring spectra, and in one example to a low cost spectrometer for use in collecting reflection or transmission spectra from a number of samples.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to utilise reflection or transmission spectra in order to measure attributes of objects such as physical samples. Particularly in environmental monitoring, this is often performed to examine samples, such as water samples or plants, in order to ascertain water quality, plant health, or the like. When measurements are being performed under variable ambient light conditions, it is generally necessary to collect multiple spectra, including transmission/reflectance spectra from the sample under consideration and further spectra of the ambient illumination conditions. This is important to allow variation in ambient light to be taken into account when examining the sample spectra.

Typically when such measurements are performed this is done in one of two ways. In one case, a single spectrometer is used with a reference measurement of ambient light being collected prior to, after, or interspersed between measurements of individual samples. In another example, two separate spectrometers are used, one of which collects measurements of ambient light conditions and the other of which collects sample spectra.

In the former case, as the reference and sample spectra are collected non-concurrently, this means there can be changes in ambient light conditions in between collection of the reference and sample spectra, meaning the sample spectra cannot necessarily be accurately interpreted. As a result, it is important for an operator to monitor environmental conditions, often requiring them to terminate or repeat measurements, should ambient conditions change, which is inconvenient.

Additionally, sensors will tend to experience drift, for example due to inherent inaccuracies, time dependent drift, and changes in external conditions, such as temperatures. For non-concurrent measurements, this can lead to inherent differences arising between measurements, meaning sample spectra cannot be accurately interpreted.

When multiple sensors are used, these need to be carefully calibrated relative to each other to ensure measurements are similar. Such a calibration is not necessarily constant over time, for example due to sensor drift, and can again lead to inaccuracies in measurements being performed. Furthermore, if there is any difference in wavelength, background signal, or sensitivity between the different sensors, this difference, which will again drift in time and based on temperature, causes large systematic errors in the reflectance values that are calculated.

In attempting to address these issues, the majority of existing solutions have focused on careful control of the sensor environment, for example utilising temperature controlled sensors, and additionally manufacturing of sensors to a high degree of accuracy to thereby minimise sense drift and calibration issues. This results in equipment which is complex, expensive and extremely sensitive, making it difficult to use and unsuitable for many applications.

A further variation on the above mentioned arrangements is to provide a single point spectrometer and switch rapidly between a number of fibre inputs using a fibre switch. However, this again leads to inaccuracies and substantial costs. For example, it is not typically possible to obtain a fibre switch that is fast enough to reduce the impact of sensor drift, and yet also covers wavelength ranges of interest for many applications. Fibre optic switches based on mechanical switching at substantially lower speeds are available, but typically cost thousands of dollars, whilst switches based on MEMS technology can reach very high speeds but with much poorer insertion loss specifications and much narrower wavelength range. This renders such solutions impractical for most applications.

CN204214770 discloses a multichannel fibre spectrometer based on a CMOS image sensor. The multichannel fibre spectrometer is characterized by consisting of a CMOS image sensing module, a prism, a slit module, a focusing lens module, guiding optical fibres and a probe, wherein the probe is connected with the focusing lens module through the guiding optical fibres; the slit module is placed on a focal plane of the focusing lens module; the prism is placed between the slit module and the CMOS image sensing module; the CMOS image sensing module is composed of a CMOS array photovoltaic conversion chip and a data transmission board, and outputs image data to a computer through an external USB transmission line; the image data is converted to multichannel spectral curves through computer software, and the multichannel spectral curves are displayed on a displayer through a display data line. The multichannel fibre spectrometer not only has the characteristics of multiple channels, high speed and the like, but also is smaller in size, lower in cost and suitable for scale production through the combination of plane perception and high frame transmission capacity of the CMOS image sensor, and an integrated manufacturing technology of an optical module.

U.S. Pat. No. 4,705,396 describes an image monochromator arranged to receive light at an input thereof simultaneously from an entire object field to be viewed and to produce and transmit a viewable image of the entire object field simultaneously through an output thereof at a selected wavelength band. The monochromator has inner and outer optical systems, the inner system comprising an input slit which is projected on an output slit through imaging means such as lenses or mirrors, via dispersive means such as a diffraction grating or prism operable to transmit light at a tunable narrow wavelength band. The outer optical system comprises an objective system, in which a picture of the object field is imaged on a picture plane by imaging means such as lenses or mirrors, with the input and output imaging means so arranged that the inner optical system receives and transmits to the output optical component light rays from each object point which have an angular relationship to each other within a range from slightly divergent to slightly convergent.

U.S. Pat. No. 7,209,230 describes an apparatus and method for measuring the spectral characteristics of an object surface. The apparatus comprises a light source for generating an input signal comprising a plurality of wavelengths of energy and a diffraction grating for diffracting the input signal into a plurality of diffracted wavelengths of energy. A resonant mirror assembly associated with the diffraction grating sequentially directs a select diffracted wavelength to the object surface to generate a corresponding reflected wavelength of energy. The apparatus further comprises a sensor for determining each select diffracted wavelength of energy directed to the object surface and a detector for detecting one or more of the reflected wavelengths. The detector is coupled with the sensor for associating each select diffracted wavelength with each corresponding reflected wavelength.

U.S. Pat. No. 7,817,274 describes compact spectrometers constructed with their spectral performance characteristics being optimized as well as with their instrument/device volume being reduced significantly. The light propagation path, either in transparent media or in free space, of the optical beams emitting from a small input aperture/slit of a spectrometer, is caused to be two-dimensional or unilateralized (propagating within a thin layer of air or media), enabling physical sizes of any optical elements needed thereafter to construct a spectrometer to be reduced significantly in one dimension. As a result, a significant reduction of instrument/device volume (in one dimension or even in two dimensions) is achieved, which is applicable to and beneficial to either a classical dispersion spectrometer or a compact dispersion spectrometer.

U.S. Pat. No. 3,619,624 describes apparatus for determining underwater optical characteristics is disclosed.

US2004/0130713 describes a spectrographic analysis method which is photometric and non-contact for determining the presence of a chosen constituent in water is provided based on the fact that the inverse of reflectance is a measure of absorption. A full spectrum measurement of the reflectance of the water is made and an absorption spectrum calculated which is then fitted to a clear spectrum in a wavelength range where the water absorption dominates so as to have scaling and offset. Then the clear water spectrum is subtracted and a matching is repeated for the spectrum of the desired constituent and thus a measure of the concentration of the constituent in the water is obtained.

U.S. Pat. No. 4,416,542 describes an apparatus and method for measuring the diffuse absorption coefficient of seawater providing reliable readings. An emitter of pulsed light is disposed below the waters surface and an irradiance receiver is located between the pulsed light emitter and the water's surface. Because the irradiance receiver is facing downward, is separated from the light emitter a given amount and may be disposed a suitable distance below the water's surface, reliable day and night-time readings are obtained that are unaffected by atmospheric or surface conditions.

U.S. Pat. No. 8,767,205 describes an apparatus for placement on or in a body of water for hyperspectral imaging of material in the water comprising an artificial light source and a hyperspectral imager. These are arranged so that in use light exits the apparatus beneath the surface of the water and is reflected by said material before re-entering the apparatus beneath the surface of the water and entering the hyperspectral imager. The hyperspectral imager is adapted to produce hyperspectral image data having at least two spatial dimensions.

U.S. Pat. No. 5,754,722 describes a fibre-optic spectroscopic probe for use with a Fourier Transform Infrared (FTIR) spectrometer for sensing the absorption of infrared energy by a sample has a shaft containing a fibre optic bundle which terminates proximate the end of the shaft for transmitting and receiving infrared energy from the sample being measured by a measuring head. The shaft has means for detachably attaching interchangeable measuring heads for measuring attenuated total reflectance, diffuse or specular reflectance of the sample, or for measuring the infrared energy transmitted through the sample. The interchangeable heads are coupled to the shaft without the use of additional optics or mechanical positioning devices. The shaft assembly may include a cooling jacket for measuring samples at elevated temperatures. Having different, interchangeable spectral sampling heads makes it possible to obtain quantitative spectral data from a wide range of samples in varying states of agglomeration and homogeneity using a single device.

US2004/0195511 describes an apparatus and method capable of providing spatially multiplexed IR spectral information simultaneously in real-time for multiple samples or multiple spatial areas of one sample using IR absorption phenomena requiring no moving parts or Fourier Transform during operation, and self-compensates for background spectra and degradation of component performance over time. IR spectral information and chemical analysis of the samples is determined by using one or more IR sources, sampling accessories for positioning the samples, optically dispersive elements, a focal plane array (FPA) arranged to detect the dispersed light beams, and a processor and display to control the FPA, and display an IR spectrograph. Fiber-optic coupling can be used to allow remote sensing. Portability, reliability, and ruggedness is enhanced due to the no-moving part construction. Applications include determining time-resolved orientation and characteristics of materials, including polymer monolayers. Orthogonal polarizers may be used to determine certain material characteristics.

However, this arrangement relies on an active infrared source having specific characteristics. In particular, the system requires that the IR light source is stable, and that its spectrum and intensity are known, not important, or well enough stabilised that continuous monitoring of the illumination is not a concern or an important part of the data capture process. As a result, this arrangement is not therefore suitable for broader applications such as in agricultural and water monitoring applications.

US2007/0127027 describes a photometer for analyzing a plurality of samples. The photometer comprises a light source and a detector. An optical assembly defines two or more light paths, each light path arranged to carry light from the light source, through a separate sample location, and to the detector. However, this system again relies on an active illumination and source and suffers from the same drawbacks as US2004/0195511.

SUMMARY OF THE PRESENT INVENTION

In one broad form an aspect of the present invention seeks to provide an apparatus for measuring spectra from one or more samples, the apparatus including: a reference waveguide that receives illuminating radiation used to illuminate at least one sample; at least one sample waveguide that receives sample radiation at least one of reflected from and transmitted through a respective sample; an optical system that: spatially distributes radiation from each of the waveguides based on a frequency of the radiation; and, focuses radiation from the optical fibres into an imaging plane; and, an imaging device that captures an image of the focused and spatially distributed radiation from the imaging plane so that the image includes respective spectra from each of the waveguides.

In one embodiment the waveguides are optical fibres.

In one embodiment the optical system: spatially distributes radiation from each waveguide in a first direction based on the frequency of the radiation; focuses radiation from the waveguides so that the radiation from each fibre is spaced in a second direction perpendicular to the first direction.

In one embodiment output ends of the waveguides are aligned extending in the second direction.

In one embodiment the optical system includes a slit and collimating lens and wherein output ends of the waveguides direct radiation through the slit and collimating lens.

In one embodiment the optical system includes: diffraction grating that spatially distributes radiation; and, one or more lenses that focus the spatially distributed radiation.

In one embodiment imaging device includes at least one of: a CMOS; an infrared sensor; a single pixel sensor; and, a CCD sensor.

In one embodiment the apparatus includes a diffusion member at an input to the reference waveguide.

In one embodiment input ends of the sample waveguides are directed towards the samples and an input end of the reference waveguide is directed away from the samples.

In one embodiment an input end of the sample fibres includes at least one of: an input lens for focusing radiation from the sample; and, a polariser for selectively filtering radiation from the sample.

In one embodiment the input lens has at least one of: a focal length of at least one of: 1 cm to 100 cm; 5 cm to 50 cm; and, 10 cm to 30 cm a field of view of at least one of 1 $cm^2$ to 10 $cm^2$; and, 2 $cm^2$ to 5 $cm^2$.

In one embodiment the apparatus includes a second reference fibre that receives reference radiation from at least one of: a reference target; a reference sample; and, a reference illumination source.

In one embodiment the apparatus includes a reference illumination source adapted to generate illumination including particular frequencies of radiation.

In one embodiment the apparatus includes a support for supporting input ends of at least some of the waveguides.

In one embodiment the input ends of at least some of the waveguides are movably mounted to the support, thereby allowing a relative field of view of the waveguide to be adjusted.

In one embodiment the support includes a boom, and wherein at least some of the sample waveguide inputs are spaced along the boom allowing reflected radiation to be received from a number of spatially distributed samples simultaneously.

In one embodiment the boom is coupled to a handle allowing a user to carry the boom, and thereby manually position the waveguides relative to one or more samples.

In one embodiment the boom extends laterally from a vehicle.

In one embodiment spectra of the illuminating radiation and sample radiation are captured at least one of simultaneously and sequentially.

In one embodiment the apparatus is adapted for measuring spectra from a water body and includes at least one of: a pair of waveguides including: a reference waveguide arranged to capture downwelling light through a diffuser; and, a sample waveguide capturing light reflected from the water body; a pair of waveguides including: a sample waveguide provided at an angle orientated downwardly to capture light reflected from the water body; and, a reference waveguide provided at a corresponding angle orientated upwardly to capture light from a part of the sky that is directly reflected from the water body onto the sample waveguide.

In one embodiment the sensor is aligned with the imaging plane.

In one embodiment the sensor receives radiation from at least one reflector aligned with the imaging plane.

In one embodiment the apparatus includes a modulator for selectively transferring radiation from the imaging plane to the imaging device.

In one embodiment the modulator includes at least one of a linear digital mirror device and a liquid crystal on silicon device.

In one embodiment the apparatus includes at least one processing device that: receives image data from the imaging device; and, stores spectral data based on the received image data.

In one embodiment the at least one processing device stores the spectral data together with reference data collected from one or more sensors.

In one embodiment the at least one processing device generates spectral data by: identifying one or more rows of pixels within the image data, the one or more rows of pixels being indicative of radiation from the waveguides; and, selectively encoding the one or more rows of pixels to form the spectral data.

In one embodiment the at least one processing device generates spectral data by: identifying one or more second order pixels within the image data based on a pixel location within the image; and, selectively encoding channels associated with the one or more second order pixels to form the spectral data.

In one embodiment the at least one processing device selectively encodes the second order pixels using at least one of: a red channel in which red pixels are at least partially sensitive to infrared light; a red and a green channel in which red and green pixels are at least partially sensitive to infrared light; an infrared channel; and, signals from a red Bayer filter channel for radiation wavelengths from 650 nm to 1000 nm.

In one embodiment the at least one processing device: generates the spectral data by performing principle component analysis on the received image data to determine principle component coefficients; and, transmits spectral data in the form of the principle component coefficients.

In one embodiment the at least one processing device is populated with principle components based on the nature of the sample to be analysed.

In one embodiment the apparatus includes at least one processing device that determines a sample spectra for each sample by determining a ratio of the sample radiation and the illuminating radiation.

In one embodiment the apparatus includes at least one processing device that performs a wavelength calibration of the sample spectra by at least one of: identifying a known combination of frequencies in the illuminating radiation; identifying a known frequency in a reference spectra measured from a reference sample; and, identifying a known frequency in illuminating radiation from a reference illuminating source.

In one embodiment the apparatus includes at least one processing device that: determines a background spectra from the spectral data; and, uses the background spectra to determine the sample spectra.

In one embodiment the background spectra is determined by identifying background pixels in the image data.

In one embodiment the illuminating radiation is at least one of: natural light; solar radiation; and, a non-artificial source of illumination.

In one embodiment the reference waveguide has an input directed at least one of: upwardly; skywards; towards a natural illumination source; and, towards a non-artificial illumination source.

In one embodiment the apparatus includes at least one processing device that processes the sample radiation to compensate for sources of errors.

In one embodiment the sources of errors include at least one of: exposure variability; sensor noise; sensor wavelength drift; sensor sensitivity drift; time dependent drift; temperature dependent drift; and, changes in illuminating radiation.

In one embodiment the apparatus uses an imaging device having at least one of: a temperature response coefficient selected from the group including: greater than ±0.1% per ° C.; greater than ±0.5% per ° C.; greater than ±1% per ° C.; a maximum drift in background current over the range 0° C. to 80° C. selected from the group including: greater than 10%; greater than 50%; greater than 200%; and, greater than 500%; a maximum drift in measurement sensitivity over the range 0° C. to 80° C. selected from the group including: less than 20%; and, less than 10%; a wavelength drift over the range 0° C. to 80° C., over a period of 1 year, selected from the group including: greater than 3 nm; greater than 5 nm; greater than 10 nm; and, up to 50 nm; a linearity over the range 0° C. to 80° C. selected from the group including: greater than 1%; greater than 2%; and, greater than 5%; and, a signal to noise ratio selected from the group including: less than 2000:1; less than 1000:1; less than 500:1; and, less than 100:1.

In one embodiment the apparatus senses radiation in at least one of: 350 nm-1000 nm; 350 nm-750 nm; 350 nm-650 nm; 400 nm-700 nm; 650 nm-1000 nm; 10 nm-380 nm; 750 nm-1400 nm; and, 1400 nm-5500 nm.

In one embodiment the apparatus is configured for use in at least one of: water quality monitoring; agriculture monitoring; environmental monitoring; food monitoring; pharmaceutical monitoring; geological monitoring; and, mine monitoring.

In one broad form an aspect of the present invention seeks to provide a method of measuring spectra from one or more samples, the method including: using a reference waveguide to receive illuminating radiation used to illuminate at least one sample; using at least one sample waveguide to receive sample radiation at least one of reflected from and transmitted through a respective sample; using an optical system to: spatially distribute radiation from each of the waveguides based on a frequency of the radiation; and, focus radiation from the optical fibres into an imaging plane; and, using an imaging device to capture an image of the focused and spatially distributed radiation from the imaging plane so that the image includes respective spectra from each of the waveguides.

In one embodiment the method is used in at least one of: water quality monitoring; agriculture monitoring; environmental monitoring; food monitoring; pharmaceutical monitoring; geological monitoring; and, mine monitoring.

It will be appreciated that the broad forms of the invention and their respective features can be used in conjunction, interchangeably and/or independently, and reference to separate broad forms is not intended to be limiting.

BRIEF DESCRIPTION OF THE DRAWINGS

Example of various embodiments of the present invention will now be described with reference to the accompanying drawings, in which:—

DETAILED DESCRIPTION OF THE PREFERRED EMBODIMENTS

Figure 1:
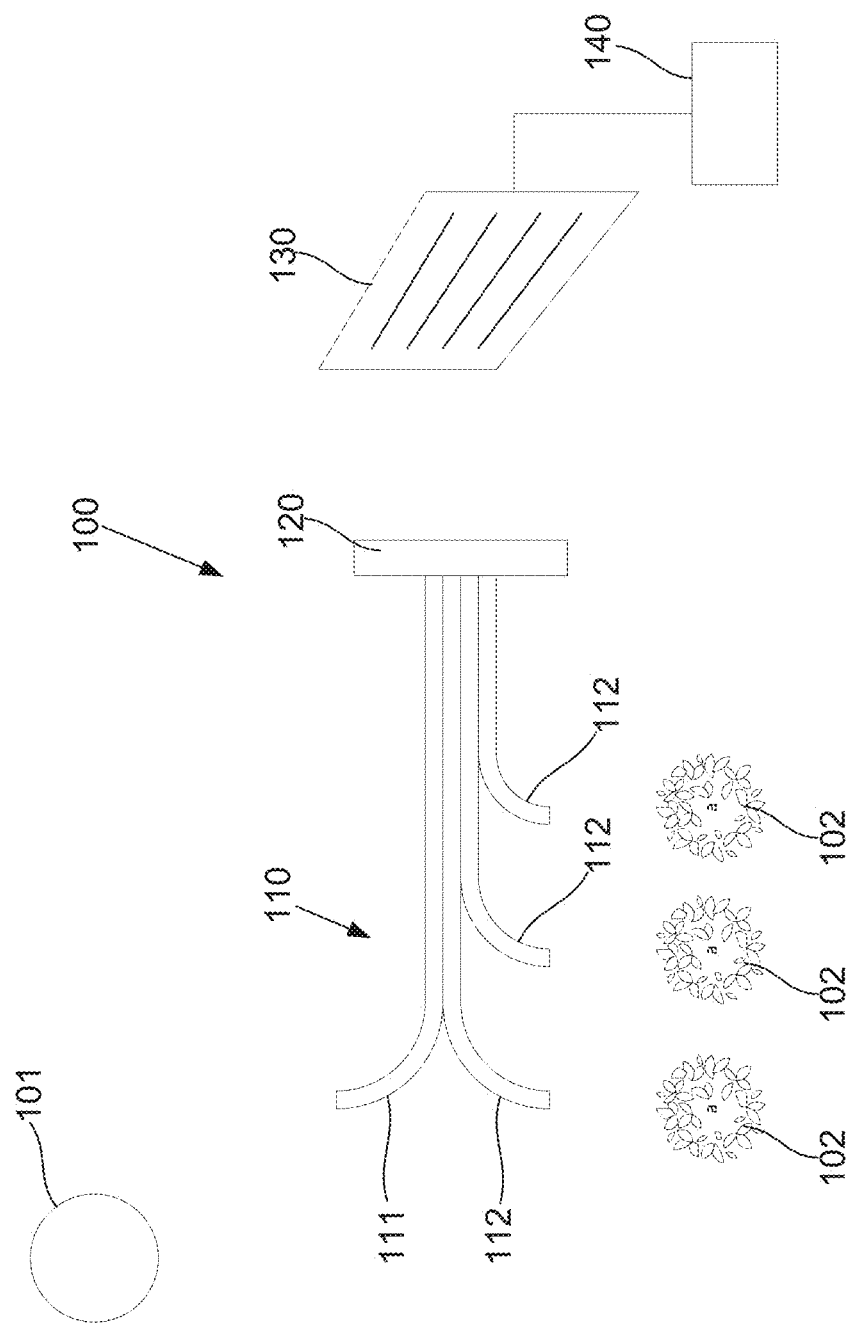
FIG. 1 is a schematic diagram of an example of an apparatus for measuring spectra from one or more samples.

An example of an apparatus for measuring spectra from one or more samples will now be described with reference to FIG. 1.

For the purpose of this example, it is assumed that the spectrometer is used to collect a reflection or transmission spectrum from a sample, which is illuminated by illuminating radiation, for example emitted from a radiation source or the like. In this regard, the radiation is electromagnetic radiation and will generally be referred to simply as radiation for ease of description. Whilst the radiation typically includes visible radiation, this is not essential and the term radiation may additionally and/or alternatively encompass other frequencies, including ultraviolet, near-infrared, infrared, or the like. It will be appreciated that the term illuminating radiation is therefore intended to refer to radiation to which the sample is exposed, and is not intended to be restrictive to visible radiation only. The illumination source could include the sun or an artificial source, such as one or more lights, and specific examples will be described in more detail below.

The sample could be of any appropriate form depending on the preferred implementation, and could include vegetation, for example in monitoring plant or crop health, water samples for monitoring water quality, or the like.

In this example, the apparatus 100 includes a reference waveguide 111 that receives illuminating radiation used to illuminate at least one sample 102. The reference waveguide need not be directed at the illumination source and more typically receives radiation over a wide field of view, for example through the use of a diffusion member or lens mounted near an end of the waveguide as will be described in more detail below. The purpose of this is to obtain an overall spectrum of the radiation that illuminates the sample, as opposed to say the radiation emitted from the source, which may not be fully characteristic of the radiation to which the sample is exposed.

The apparatus 100 further includes at least one sample waveguide 112 that receives sample radiation that is either reflected from or transmitted through a respective sample 102. In this example, three sample waveguides 112 in the form of optical fibres are provided, allowing spectra to be collected from three respective samples, but this is not essential and any number of sample waveguides or waveguides of any suitable form may be provided. In this instance, the sample waveguides are arranged to receive reflected radiation from the sample 102, but again this is not essential and as will become apparent from the following description, transmitted radiation could alternatively be collected through suitable positioning of the ends of the sample waveguides.

The spectrometer includes an optical system 120 that spatially distributes radiation from the waveguides based on a frequency of the radiation received from each waveguide, and further focuses radiation from the waveguides into an imaging plane. In one particular example, the optical system typically includes a dispersion element, such as a prism or diffraction grating, to spatially disperse the radiation and one or more lenses for focusing the dispersed radiation. This allows the dispersed radiation to be focused into the imaging plane, allowing this to be captured by an imaging device 130, such as a CMOS (Complementary metal-oxide-semiconductor) image sensor, a CCD (Charge-Coupled Device) sensor, or the like.

Figure 2A:
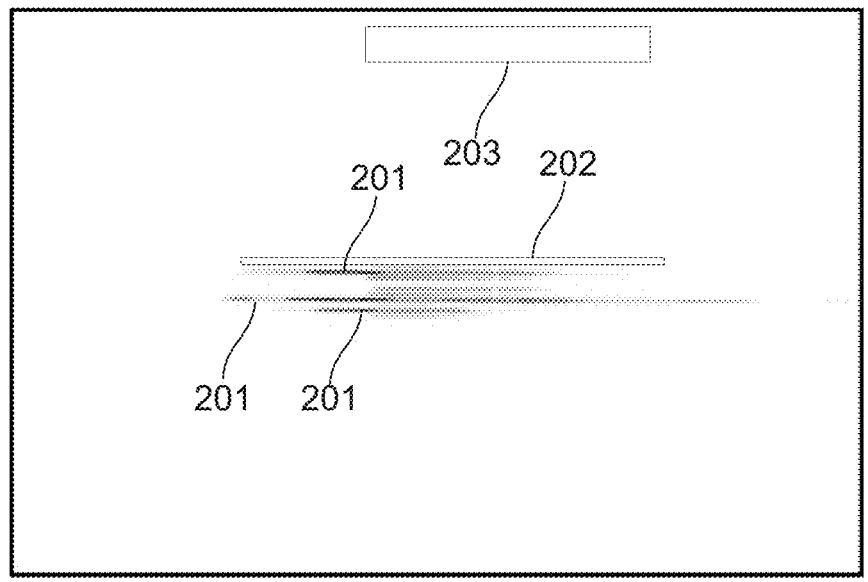
FIG. 2A is an example of an image indicative of captured sample spectra.

In one example, this arrangement allows a single image to be captured using a single sensor, with the image including respective spectra from each of the optical fibres spaced apart on the image, as shown for example in FIG. 2A. Once collected the image may be provided to a processing device 140, or other similar arrangement, allowing this to be processed and/or stored for subsequent analysis. Alternatively, this arrangement can be used to collect a number of spectra in rapid succession, using a modulator such as a DMD (Digital Mirror Device) or the like, with separate spectra being stored for subsequent analysis as will be described in more detail below.

The above described arrangement can provide a number of benefits over traditional arrangements. In particular, the above described arrangement allows multiple spectra to be collected simultaneously or substantially simultaneously from both illuminating radiation and one or more samples, using the same sensor. The use of the same sensor, avoids the need to calibrate multiple sensors, and avoid the issues of relative sensor drift, through the use of complex sensing devices. Additionally, as the reference and sample spectra are collected concurrently or substantially concurrently, there can be no sensor drift between when the reference and sample spectra are collected, and no variation in the illuminating radiation between collection of the reference and sample. This in turn allows the sample spectra to be analysed with respect to the reference spectrum of the illuminating radiation confident in the knowledge that the reference spectrum accurately reflects the radiation that was illuminating the sample when the sample spectra are collected. As a result of this, the above described apparatus does not require complex or expensive sensor calibration mechanisms, or sensors that are highly stabilised to prevent sensor drift. This in turn allows a highly accurate spectrometer to be realised utilising cheap hardware arrangements which has not traditionally been the case.

A number of further features will now be described.

The waveguides can be of any appropriate form, as long as they are capable of collecting radiation from a source and guiding radiation. Whilst other arrangements, such as a thin film waveguides could be used, the waveguides are typically optical fibres, and may be provided as respective individual optical fibres, or fibres forming part of an optical fibre bundle. The use of optical fibres is particularly beneficial due to the ubiquitous nature, and flexibility, which allows their field of view to be adjusted ensuring that radiation is collected from the source as required. The waveguide may also be coupled to or incorporate optical elements, such as diffusion members, input lenses, polarisers, or the like to assist with collecting and/or filtering radiation as required. For ease of description, the following description will focus on the use of optical fibres, but it will be appreciated that this is for ease of description and is not necessarily intended to be limiting.

Figure 2B:
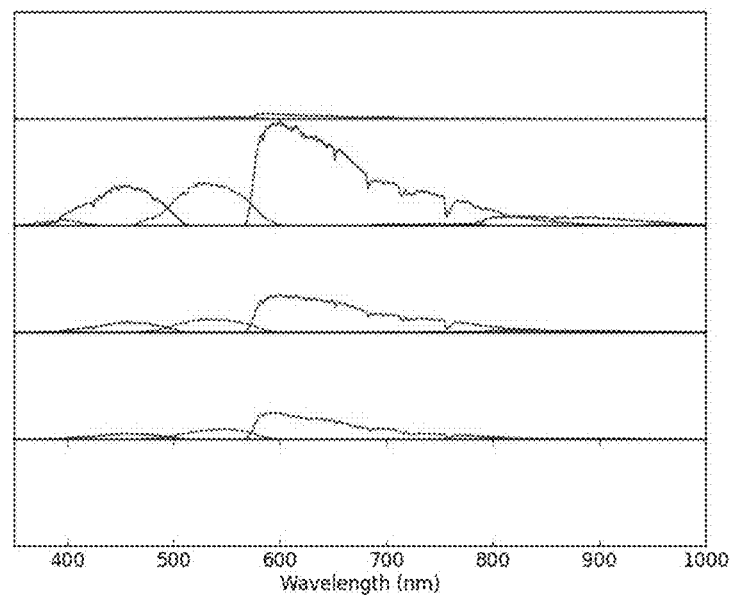
FIG. 2B is a graph of examples of collected spectra.

In one example, the optical system spatially distributes radiation from each optical fibre in a first direction based on the frequency of the radiation, and focuses radiation from the optical fibres so that the radiation from each fibre is spaced in a second direction, perpendicular to the first direction. Thus, as shown in the example image of FIG. 2A, a number of spectra 201 from samples and illuminating radiation are spaced apart in a vertical direction, with each spectrum extending horizontally across the image. Examples of corresponding spectra extracted from the image are shown in FIG. 2B. It will be appreciated that this allows direct comparison between the spectra allowing an individual or computer system to readily examine differences in the spectra.

This arrangement can be achieved utilising any appropriate optical system. In one example, alignment of the spectra is achieved by having output ends of the optical fibres aligned in the second direction, with the optical fibres being directed towards a slit extending in the second direction. Radiation passing through the slit is focused by a collimating lens onto a dispersion element, such as a diffraction grating or prism, which spatially distributes the radiation in the first direction. One or more lenses then focus the spatially distributed radiation onto an imaging plane aligned with the imaging device, which is typically a two dimensional imaging device such as a CMOS sensor, but could include other sensors, such as thermal imagers, infrared sensors, single pixel sensors, CCD sensors, or the like. It will be appreciated that the apparatus can be used for sensing a wide range of wavelengths of radiation depending on the sensor employed. This could include, but is not limited to radiation in one or more of the wavelength ranges 350 nm-1000 nm, 350 nm-750 nm, 350 nm-650 nm, 400 nm-700 nm, 650 nm-1000 nm, 10 nm-380 nm, 750 nm-1400 nm and 1400 nm-5500 nm.

The apparatus can include a diffusion member, such as a diffuser, provided at an input end of the reference optical fibre, thereby allowing the reference optical fibre to capture illuminating radiation over a wide range of incident angles. This ensures that the captured radiation represents an overall spectra for the radiation that is used to illuminate the sample. As previously mentioned, lenses could also be provided at input ends of the sample optical fibres, allowing radiation to be accurately collected from one or more target samples. Additionally, input ends of the sample waveguides are typically directed towards the samples, whilst an input end of the reference waveguide is directed away from the samples, thereby allowing illuminating radiation to be captured.

It will be appreciated that the particular configurations used will vary depending on the preferred implementation. For example, when monitoring crops, it may be necessary to acquire spectra from individual plants. Accordingly, a lens system is provided for each sample fibre that defines a field of view generally corresponding to an extent of all or part of the plant, such as an area of a few square centimetres, and a focal length based on the distance of the fibre end from the plant, typically a few centimetres. Alternatively, it may be desirable to obtain spectra from all or part of a canopy of vegetation, in which case a larger field of view of several square metres, and a great focal length, such as several tens of metres, may be employed. Similarly, when monitoring a body of water, a greater separation and hence focal length, and a greater field of view may be required.

It will also be appreciated that different sample fibres may be provided with different lens arrangements to define different, and potentially overlapping fields of view. Lens may also be provided with focusing mechanisms, ensuring optimal capture conditions are used. The lenses could also form part of an imaging arrangement, such as a microscope, telescope, camera or the like. From this, it will be appreciated that capture distances could range from a few millimetres up to several metres, or even kilometres, whilst fields of view could range from a few square millimetres, up to several square metres, or kilometres. However, typically the system is employed with a separation from the sample and hence focal length of 1 cm to 100 cm and more typically 5 cm to 50 cm, and 10 cm to 30 cm, with a field of view of between 1 $cm^2$ to 10 $cm^2$ and 2 $cm^2$ to 5 $cm^2$.

The apparatus can also include a second reference fibre that receives reference radiation at least one of reflected from or transmitted by a reference sample or reference target. This can be utilised in order to calibrate the wavelength of captured radiation, as will be described in more detail below, for example by capturing radiation from a target or sample having a known spectral response to illuminating radiation such as a white target, or target with a specific colour. Alternatively and/or additionally, the apparatus can include a reference illumination source, such as a lamp, LED or laser, adapted to generate illumination including one or more particular frequencies of radiation, in which case the second reference fibre or a third reference fibre could be used to receive radiation from the reference illumination. As a further alternative, such calibration can be achieved by identifying specific known peaks or troughs in the illuminating or sample radiation, as will be described in more detail below.

The apparatus can have any desired physical configuration, but in one example, the apparatus includes a support for supporting input ends of at least some of the optical fibres. In one example, input ends of at least some of the optical fibres are movably mounted to the support, thereby allowing a relative field of view of the optical fibres to be adjusted.

In one example, the apparatus includes a boom and at least some of the sample optical fibre inputs are spaced along the boom allowing radiation to be received from a number of spatially distributed samples simultaneously. The boom can be coupled to a handle allowing a user to carry the boom, and thereby manually position the waveguides relative to one or more samples, or alternatively, this could be mounted to a vehicle, allowing sample spectra to be collected as the vehicle passes by the samples. This is particular useful for example when sampling rows of crops, but it will be appreciated that this has other applications, such as sampling radiation from different locations on a single sample. Alternatively, other configurations of optical fibre supports can be utilised, or the optical fibres could be positioned remotely to each other, and further example arrangements will be described in more detail below.

For example, when measuring spectra from a water body, the apparatus typically includes a pair of waveguides including a reference waveguide arranged to capture downwelling light through a diffuser and a sample waveguide capturing light reflected from the water body. A second pair of waveguides can be provided including a sample waveguide provided at an angle orientated downwardly to capture light reflected from the water body and a reference waveguide provided at a corresponding angle orientated upwardly to capture light from a part of the sky that is directly reflected from the water body onto the sample waveguide. This optimises the collection of spectra from the water body, allowing reflectances to be more easily identified and excluded from the spectra during analysis.

As previously mentioned, the spectra of the illuminating radiation and sample radiation can be captured either simultaneously or substantially simultaneously in a sequential manner. In this regard, when using sensors such as infrared sensors, these tend to be more expensive and optionally require cooling. Accordingly, in this instance a 2-D sensor positioned in the imaging plane can be replaced with a 1-D or single pixel sensor, with radiation being selectively provided from the imaging plane to the sensor, for example using a modulator, such as a DMD, a LCOS (Liquid Crystal On Silicon) device, or the like. In this instance, the modulator is typically provided in the imaging plane and is adapted to selectively direct radiation onto the sensor. Thus radiation from respective spectra can be selectively reflected onto a 1-D sensor, allowing each spectra to be measured sequentially. Additionally and/or alternatively, respective pixels within each spectra, corresponding to respective wavelengths of radiation, can be reflected onto a single pixel sensor in turn, allowing each spectra to be collected using a sequence of successive measurements scanning through the respective wavelengths. It will be appreciated that whilst this does not provide some of the benefits of the use of simultaneous collection of multiple spectra, this allows the system to be utilised with more expensive infrared sensors, which often require cooling or the like, without overly increasing the cost. Despite this, as measurements can be collected rapidly, and as illuminating radiation is still captured for each set of measurements, this still avoids the issues of calibration and variation in illuminating radiation associated with prior art techniques.

The apparatus typically includes at least one processing device that receives image data from the imaging device and stores or transmits spectral data based on the received image data. The spectral data could be in the form of one or more entire images captured by the imaging device, but may include information regarding some of the pixels of the image only, as will be described in more detail below. The spectral data could be associated with reference data stored for example as metadata and which is indicative of additional information such as the time and date on which the image data was captured, the capture location, ambient conditions for example received from other sensors or the like. Such reference data can be utilised when subsequently reviewing or analysing the spectral data to assist in data interpretation.

In one example, the process of generating the spectral data can include compressing the image data. This can be performed in order to reduce storage requirements, and to reduce the time required to store the spectral data, which can be important in some applications, such as the storing of sequences of images, in the form of video data. In one example, the compression should be lossless in order to avoid the loss of spectral information from the collected data. In order to achieve this, the at least one imaging processing device typically generates spectral data by identifying one or more rows of pixels within the image data which correspond to rows of pixels encoding radiation from the optical fibres. The processing device can then selectively encode the one or more rows of pixels to form the spectral data, thereby effectively discarding other parts of the image which do not contain useful information. Thus, this can be used to allow captured images to be stored utilising lossless compression of the pixels that encode the spectra, whilst still minimising the volume of data which is stored by a significant amount. This is particularly important as this allows video capture to be performed so that spectra can be captured dynamically over time without requiring computationally expensive encoding schemes.

As mentioned above, the spectrometer uses a dispersive optical element that provides a spatial separation between light of different wavelengths. The dispersive element most commonly used in spectrometers is a diffraction grating, which uses optical diffraction to separate light based on the wavelength. The angle that light is deflected by a diffraction grating is a function of the wavelength and the order of diffraction, and is given by the equation:

$$m\lambda = d \sin(t)$$

where: d is the spacing between lines on the diffraction grating,
$\lambda$ is the wavelength of the light, and
t is the angle of diffraction, and
m is the order, which can be any whole number.

A spectrometer that is made to detect light over more than a factor of 2 in wavelength is necessarily plagued by the problem of 2nd order diffraction, since light at one wavelength $\lambda 1$ will appear at angles t1, corresponding to $\lambda 1$ and t1', corresponding to $2\lambda$.

For light at wavelength $\lambda 2$ which is exactly twice $\lambda 1$, that is, $\lambda 2 = 2\lambda 1$, light at this wavelength is deflected at an angle t2, where t2=t1', meaning that light at two different wavelengths will fall at the same point in the spectrometer.

Many spectrometers use a filter or band sensitive detector that removes sensitivity to light outside some interval over which $\lambda$ varies by less than a factor of two, but this is a limitation in the bandwidth of the spectrometer. Other designs, which span more than a factor of two, use an order filter to remove the 2nd order effect in the area of the sensor where this confusion can take place.

As an alternative approach the current arrangement uses the Bayer filter of a colour camera as an order filter, which dramatically lowers the cost and simplifies the construction of the device. As seen in FIG. 2B, the blue light that appears from 400-500 nm also reappears in the interval 800-1000 nm. By using only the red, or the red and green pixels in the wavelength interval 800-1000 nm, the apparatus ignores 2nd order diffraction problem and provides an accurate measurement of the infrared spectrum all the way up to 1000 nm without the need for an additional order filter. The pixels which lie in the part of the spectrum where this effect happens we term "second order pixels" throughout the remainder of this specification.

Thus, in one example, the processing device can process images by identifying one or more second order pixels based on pixel locations within the image. Once identified, the processing device can then selectively encode different optical channels associated with the one or more second order pixels to form the spectral data. In this regard, when using dispersion element such as a diffraction grating, certain wavelengths of radiation may result in second order signals. For example, blue wavelength radiation at 400 nanometres can also result in a signal at the spatial location that would otherwise correspond to an 800 nanometre wavelength signal. As imaging devices typically capture signals over multiple colour channels, such as RGB, the blue channel can simply be discarded in regions where signals would result in a second order diffraction, thereby providing a mechanism for cheaply and easily filtering second order components from the spectra, thereby ensuring the resulting spectra are more accurate whilst avoiding the need for complex filtering processes. Thus, second order pixels could be encoded using red and/or red and green channels only, in which red and green pixels are at least partially sensitive to infrared light, or an infrared channel. This ensures a high degree of accuracy, whilst significantly minimising the cost and complexity of the apparatus compared to traditional arrangements.

It will also be appreciated that other forms of analysis could be used. For example, the processing device can be adapted to generate the spectral data by performing principle component analysis on the received image data to determine principle component coefficients. These components can then be stored and/or transmitted, thereby vastly reducing the data storage/transmission requirements. In this instance, it is typical for the processing device to be populated with principle components based on the nature of the sample to be analysed, thereby optimising the accuracy and data reduction that can be achieved.

The apparatus can include at least one processing device that can determine the spectra for each sample by determining a ratio of the sample radiation and the illuminating radiation. This allows the spectrum of the illuminating radiation to be taken into account when analysing the sample spectrum, as will be appreciated by persons skilled in the art.

The processing device can perform a wavelength calibration either by using a reference sample as previously described, or by identifying a particular combination of known frequencies in the illuminating radiation, or by using known frequencies in a reference illuminating radiation source, and using this to calibrate wavelength in the captured spectra. For example, fluorescent lights are known to produce defined spectra having peaks at particular wavelengths, whilst sunlight is known to have peaks and troughs at particular wavelengths, which can in turn be used to scale the spectra captured by the apparatus. This allows absolute calibration to be performed without requiring expensive calibration equipment.

The apparatus can also include at least one processing device that determines a background spectra from the spectral data and uses the background spectra to determine the sample spectra. In this regard, the imaging device can be subject to noise and/or exposed to ambient radiation, for example due to leakage into the housing. This can in turn lead to a contribution to the measured spectra which is not directly attributable to the radiation reflected or transmitted by the sample. Accordingly, in one example, spectra are measured from pixels that are not intentionally exposed to radiation, with the resulting background spectra being used in analysis of the sample spectra, either through subtraction, or other suitable processing. In one example, this is achieved by identifying background pixels in the image data, such as pixels in a row aligned with, but offset from pixels in a measured spectra, as shown at 202 in FIG. 2A, or by measuring spectra from another defined location in the image, such as an edge of the image as shown at 203 in FIG. 2A.

It will be appreciated that the above described arrangements can be used with a wide range of illumination sources. In particular, by allowing the processing device to remove background noise and/or illuminating radiation from the sample radiation, this allows the apparatus to be used with illuminating radiation including natural light, solar radiation or any other non-artificial source of illumination, and allows the system to be used with low cost sensors that do not need to be optimised to reduce errors. In particular capturing the illuminating radiation and/or background noise at the same time as the sample radiation allows these to be removed from the sample spectra, so that the sample radiation accurately reflects the reflectance and/or transmission spectra, irrespective of the illuminating radiation and degree of noise.

To achieve this, the apparatus typically includes a reference waveguide that has an input directed upwardly, skywards, towards a natural illumination source or towards a non-artificial illumination source.

Typically the apparatus includes at least one processing device that processes the sample radiation to compensate for sources of errors, such as exposure variability, sensor noise, sensor wavelength drift, sensor sensitivity drift, time dependent drift, temperature dependent drift, changes in illuminating radiation, or the like. This can allow the apparatus to use an imaging device of much lower quality than traditional arrangements, including sensors having a temperature response coefficient such as greater than ±0.1% per ° C., greater than ±0.5% per ° C., or greater than ±1% per ° C., a maximum drift in background current over the range 0° C. to 80° C. such as greater than 10%, greater than 50%, greater than 200%, or greater than 500%, a maximum drift in measurement sensitivity over the range 0° C. to 80° C. such as less than 20%, or less than 10%, a wavelength drift over the range 0° C. to 80° C., over a period of 1 year, such as greater than 3 nm, greater than 5 nm, greater than 10 nm, or up to 50 nm, a linearity over the range 0° C. to 80° C. such as greater than 1%, greater than 2%, or greater than 5%, and, a signal to noise ratio such as less than 2000:1, less than 1000:1, less than 500:1, or less than 100:1.

In one example, the above described arrangement provides a method of measuring spectra from one or more samples, the method including using a reference waveguide to receive illuminating radiation used to illuminate at least one sample, using at least one sample waveguide to receive sample radiation at least one of reflected from and transmitted through a respective sample, using an optical system to spatially distribute radiation from each of the waveguides based on a frequency of the radiation and focus radiation from the optical fibres into an imaging plane, and using an imaging device to capture an image of the focused and spatially distributed radiation from the imaging plane so that the image includes respective spectra from each of the waveguides.

Figure 3A:
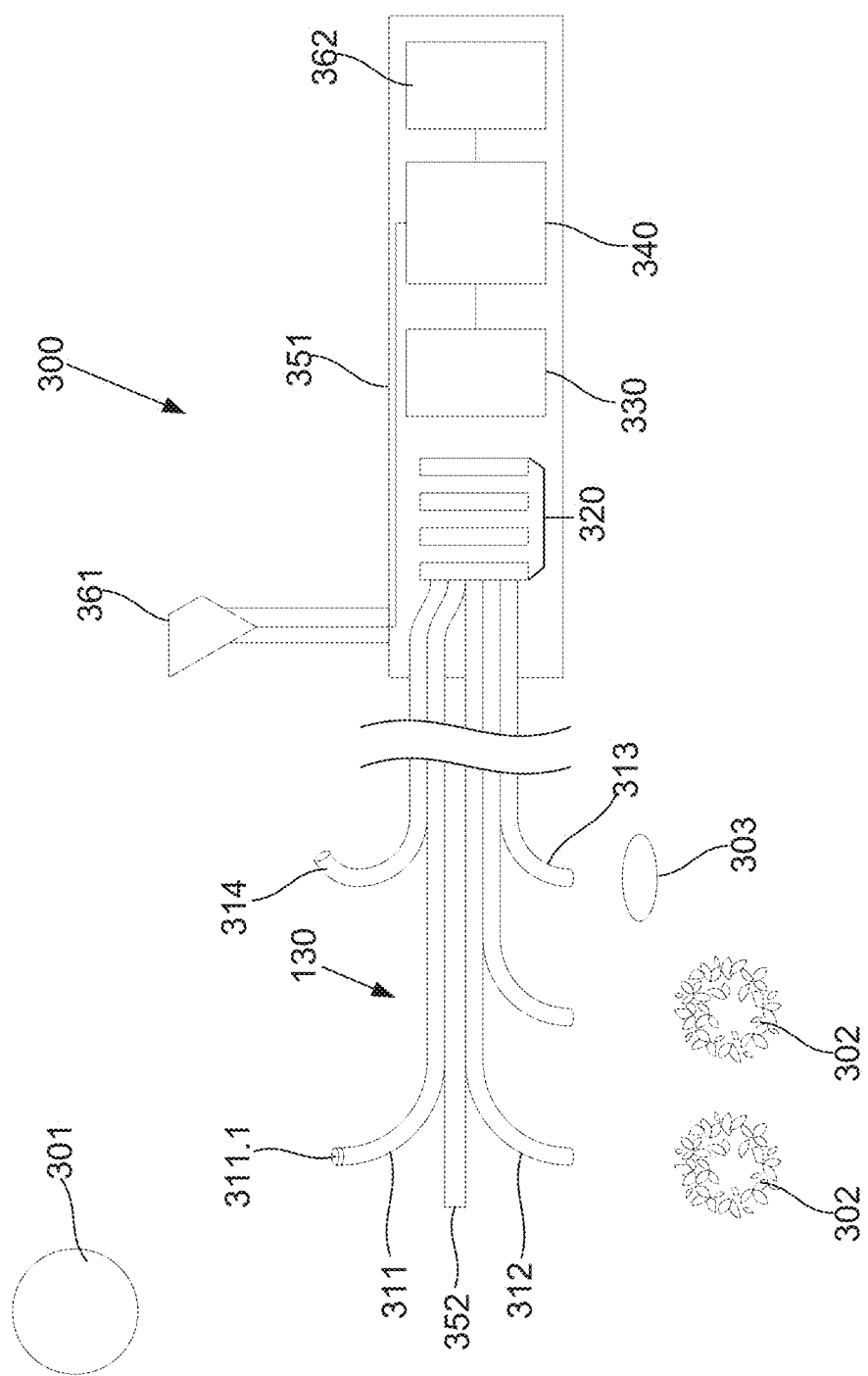
FIG. 3A is a schematic diagram of a second example of an apparatus for measuring spectra from one or more samples.
Figure 3B:
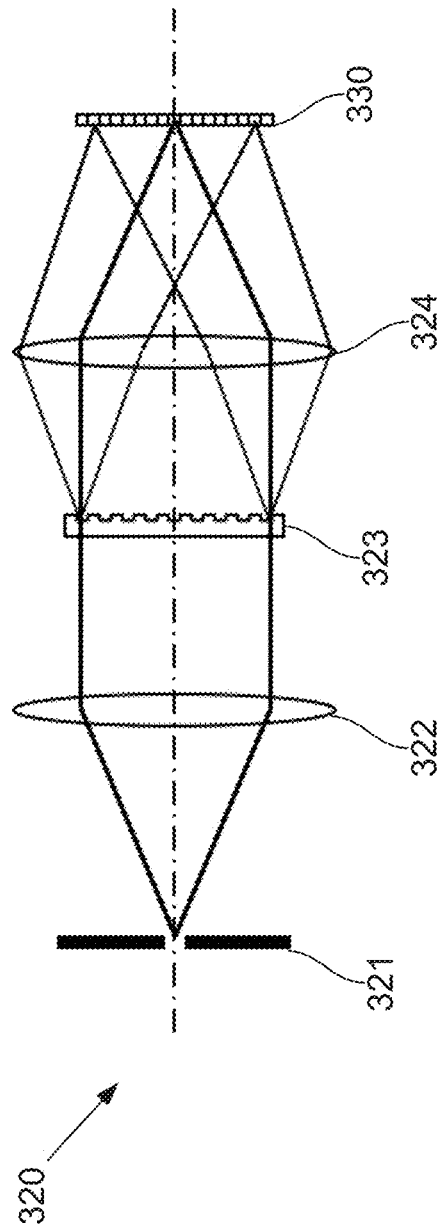
FIG. 3B is a schematic plan view of the optics of the apparatus of FIG. 3A.
Figure 3C:
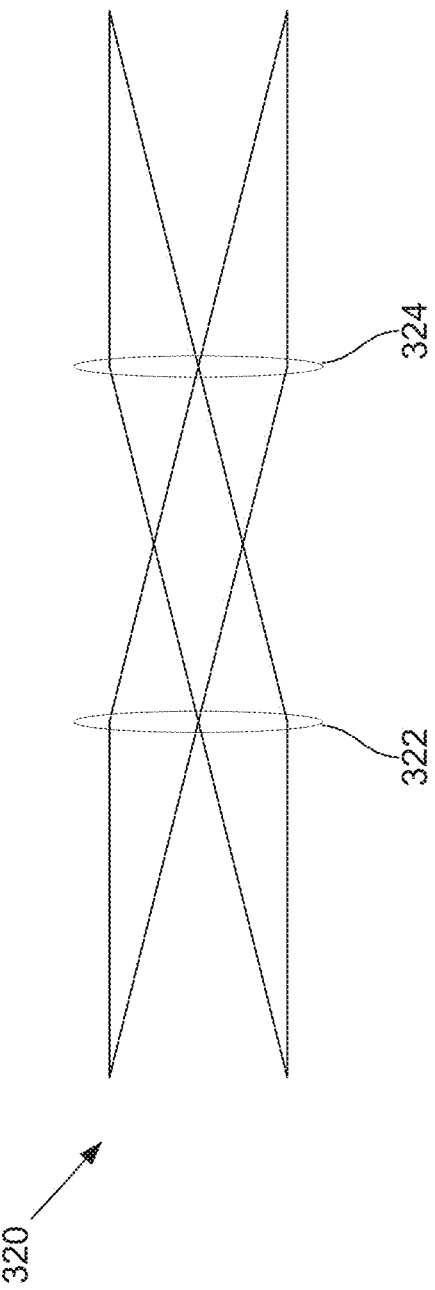
FIG. 3C is a schematic side view of the optics of FIG. 3B.

A further example apparatus will now be described with reference to FIG. 3. For the purpose of illustration similar components are designated by similar reference numerals or be it increased by 200 compared to the apparatus shown in FIG. 1.

Accordingly, in this example, the apparatus 300 again includes a reference optical fibre 311 and sample optical fibres 312. In this example, an additionally second reference fibre 313 is provided for receiving radiation reflected from a reference sample 313, whilst a third reference optical fibre 314 can be used to detect radiation from a reference radiation source 361, such as a controllable light.

The optical fibres are mounted on a boom 352 which extends outwardly from a body 351. Input ends of the sample optical fibres 311 are spaced apart along the boom, allowing radiation to be collected from a number of spaced apart samples simultaneously. The body can be of any appropriate form, and in one example is formed as a handle allowing the apparatus 300 to be carried by a user. However, this is not essential and alternatively the body 351 could be coupled to or integrated into a device, such as a vehicle or the like. In either case, the arrangement allows spectra to be collected as the body and boom 351, 352 are positioned relative to one or more samples. In one specific example, this can be used to allow spectra to be collected from rows of crops or other plants, with spacing between the ends of the fibres being based on spacing between the rows of crops.

The apparatus 300 includes an optical system 320, which disburses and focuses radiation onto the detector 330, which is in turn connected to a processing system 340. The optical system is shown in more detail in FIGS. 3B and 3C. As shown in this example, the optical system includes a slit 321, which is generally aligned with ends of the optical fibres. Radiation passing through the slit is collimated by a collimated lens 322 and then disbursed by a diffraction grating 324, before being focused by a focusing lens 324 onto the detector 330. It will be appreciated that in alternative examples, the detector 330 could be replaced by a DMD or other similar modulator, which then focusses radiation onto a sensing device, such as a single pixel sensor or the like.

Figure 4:
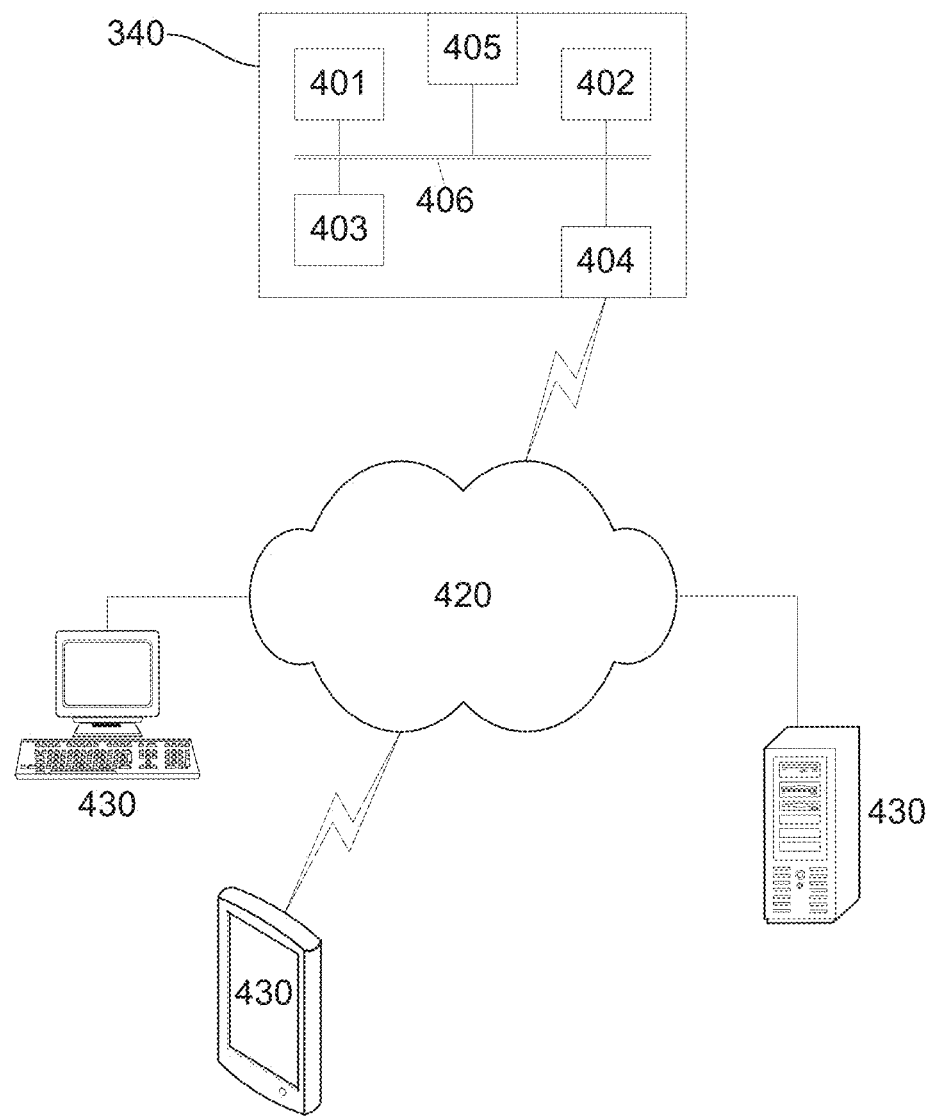
FIG. 4 is a schematic diagram of a distributed computer architecture.

The apparatus 300 further includes a spectrometer processing system 340 for processing and/or storing spectral data and optionally controlling the light 361 and/or receiving data from one or more other sensors 362. The nature of the spectrometer processing system 340 will vary depending upon the preferred implementation. Whilst the spectrometer processing system 340 can be a stand-alone processing system, more typically this operates in conjunction with other processing systems, for example allowing the spectrometer processing system 340 to collect and store spectral data, with this being subsequently interpreted by other processing systems optionally forming part of a distributed architecture and an example of this will now be described with reference to FIG. 4.

In this example, the spectrometer processing system 340 is coupled to one or more other computer systems 430, such as personal computer systems, servers, client devices or the like, via one or more communications networks 420, such as the Internet, and/or a number of local area networks (LANs). It will be appreciated that the configuration of the spectrometer processing system 340, the computer systems 430 and networks 420 are for the purpose of example only, and in practice the spectrometer processing system 340 and the computer systems 430 can communicate via any appropriate mechanism, such as via wired or wireless connections, including, but not limited to mobile networks, private networks, such as an 802.11 networks, the Internet, LANs, WANs, or the like, as well as via direct or point-to-point connections, such as Bluetooth, or the like. Whilst the computer system 430 are shown as a single entity, it will be appreciated that these could be provided as part of a cloud based environment. Thus, the above described arrangement is not essential and other suitable configurations could be used.

The spectrometer processing system 340 typically includes at least one microprocessor 401, a memory 402, an optional input/output device 403, such as input buttons and indicators, a touch screen, or the like, an external interface 404, an internal interface 405, interconnected via a bus 406 as shown. In this example the external interface 404 can be utilised for connecting the spectrometer processing system 340 to the communications networks 420, or the like, whilst the internal interface 405 is used for connecting the spectrometer processing device 340 to the imaging device 330, the light 361 and/or additional sensors 362, including environmental sensors, such as temperature or humidity sensors, location sensors, such as GPS, or the like. Although a single external interface 404 is shown, this is for the purpose of example only, and in practice multiple interfaces using various methods (eg. Ethernet, serial, USB, wireless or the like) may be provided.

In use, the microprocessor 401 executes instructions in the form of applications software stored in the memory 402 to allow the required processes to be performed. The applications software may include one or more software modules, and may be executed in a suitable execution environment, such as an operating system environment, or the like.

Accordingly, it will be appreciated that the spectrometer processing system 340 may be formed from any suitable processing system. In one particular example, the spectrometer processing system 340 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

Figure 5:
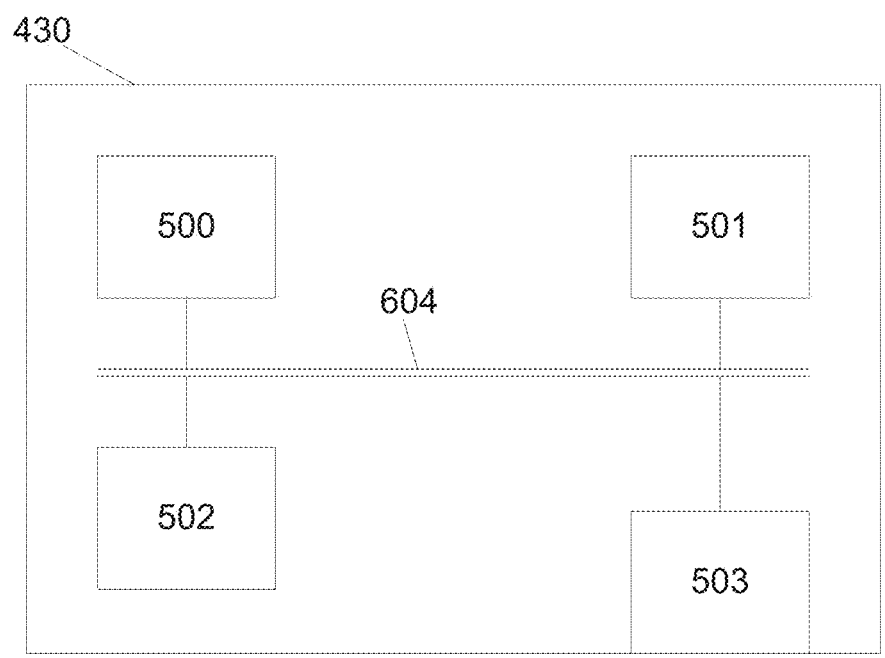
FIG. 5 is a schematic diagram of an example of a processing system.

An example of one of the computer systems 430 will now be described with reference to FIG. 5.

In this example, the computer system 430 includes at least one microprocessor 500, a memory 501, an input/output device 502, such as a keyboard and/or display, and an external interface 503, interconnected via a bus 504 as shown. In this example the external interface 503 can be utilised for connecting the computer system 430 to peripheral devices, such as the communications networks 420, databases, other storage devices, or the like. Although a single external interface 503 is shown, this is for the purpose of example only, and in practice multiple interfaces using various methods (eg. Ethernet, serial, USB, wireless or the like) may be provided.

In use, the microprocessor 500 executes instructions in the form of applications software stored in the memory 501 to allow relevant processes to performed, such as analysing images stored by the spectrometer 300.

Accordingly, it will be appreciated that the computer systems 430 may be formed from any suitable processing system, such as a suitably programmed server, web server, PC, Internet terminal, lap-top, hand-held PC, tablet, or smart phone, or the like. Thus, in one example, the computer system 430 is a standard processing system such as an Intel Architecture based processing system, which executes software applications stored on non-volatile (e.g., hard disk) storage, although this is not essential. However, it will also be understood that the computer system 430 can be any electronic processing device such as a microprocessor, microchip processor, logic gate configuration, firmware optionally associated with implementing logic such as an FPGA (Field Programmable Gate Array), or any other electronic device, system or arrangement.

Examples of the processes for capturing and analysing images using the apparatus 300 will now be described in further detail. For the purpose of these examples it is assumed the spectrometer processing system 340 captures, processes and stores images, with these being subsequently analysed using one of the computer systems 430.

To achieve this, the spectrometer processing system 340 typically executes applications software for image capture and processing, with actions performed by the spectrometer processing system 340 being performed by the processor 401 in accordance with instructions stored as applications software in the memory 402 and/or input commands received from a user via the I/O device 403. It will also be assumed that the user interacts with the computer systems 430 via a GUI (Graphical User Interface), or the like presented on the computer systems 430. Actions performed by the computer systems 430 are performed by the processor 500 in accordance with instructions stored as applications software in the memory 501 and/or input commands received from a user via the I/O device 502.

However, it will be appreciated that the above described configuration assumed for the purpose of the following examples is not essential, and numerous other configurations may be used. It will also be appreciated that the partitioning of functionality between the spectrometer processing system 340 and the computer systems 430 will vary depending on the particular implementation.

Figure 6:
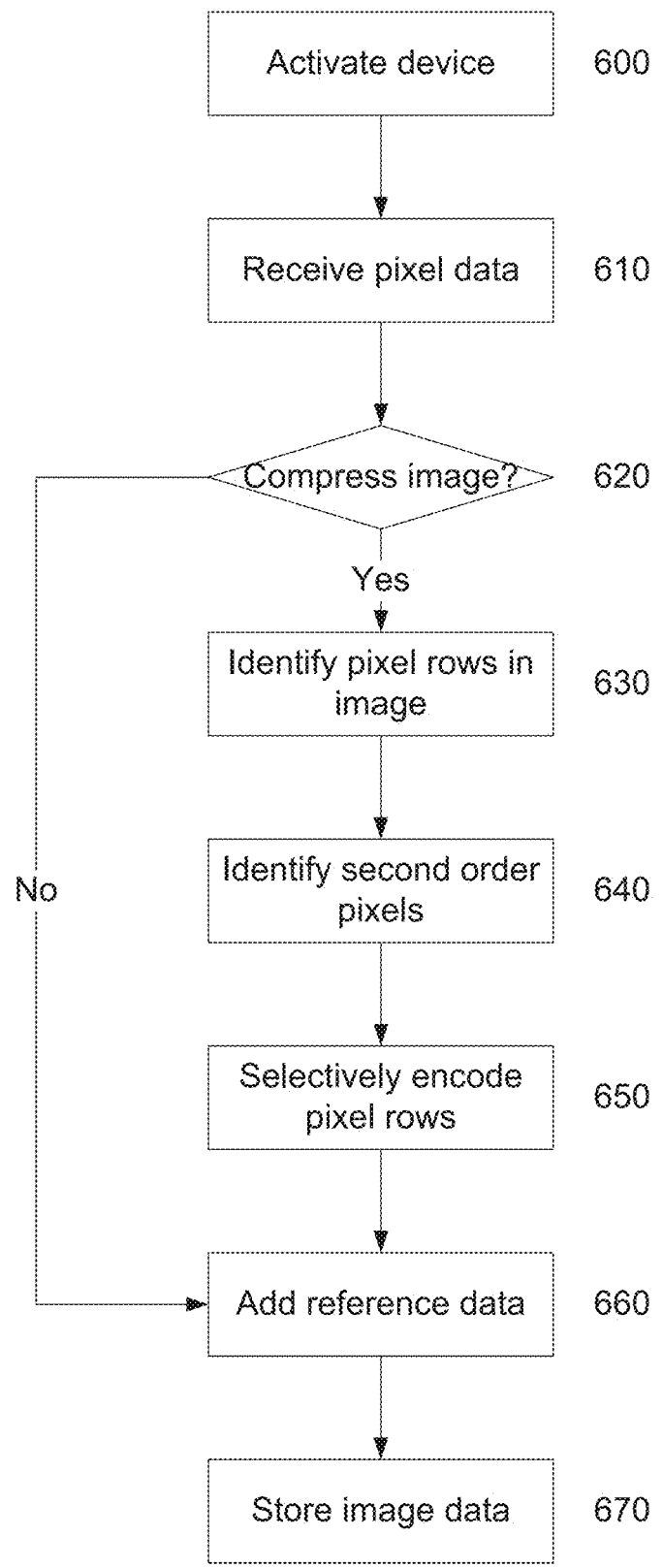
FIG. 6 is a flow chart of an example of a process for image capture.

An example of the operation of the apparatus of FIG. 3 will now be described with reference to FIG. 6.

In this example, at step 600, the apparatus 300 is activated, for example using a suitable input command provided to the spectrometer processing device 340. The spectrometer processing device 340 activates the imaging device 330 causing image data corresponding to one or more images to be generated. At step 610 the spectrometer processing device 340 receives image data from the imaging device 330, including intensity values for each of RGB channels.

At step 620 the processing system 340 determines whether the image is to be compressed. In this regard, if individual images are captured these could simply be stored for subsequent processing without requiring compression. Furthermore, even if compression is performed for images in a video sequence, it is also typical to capture at least some raw uncompressed images for calibration and/or verification purposes.

If it is determined that compression is not required, at step 660 reference data is generated, for example by recording data from additional sensors 362, such as information regarding the time and date, location of image capture, or the like, before the image is stored at step 670.

Figure 7:
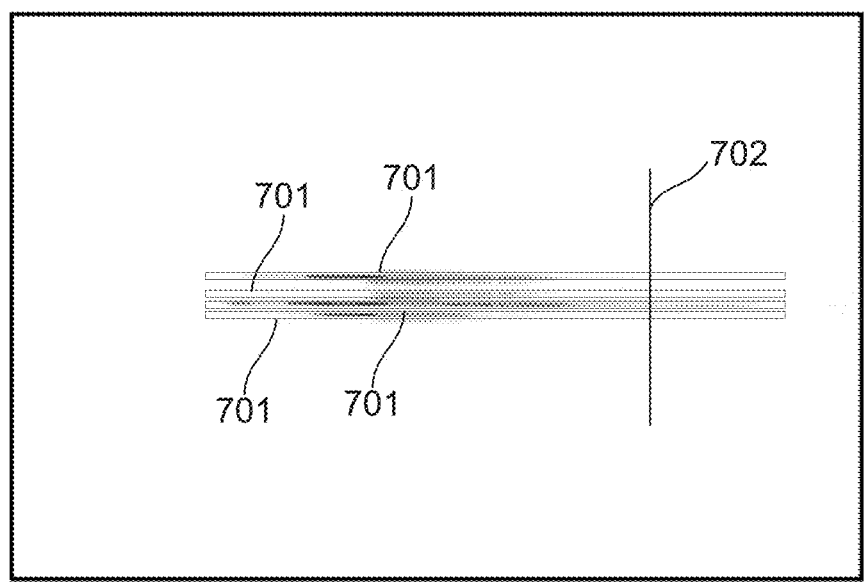
FIG. 7 is a schematic diagram illustrating different portions of captured image.

Otherwise, at step 630 the processing system 340 operates to identify pixel rows in the image. An example of pixel rows are shown in FIG. 7, with the pixel rows being shown at 701.

The pixel rows can be identified in any one of a number of manners. For example, this could include scanning an image in the second (vertical) direction and identifying changes in intensity, which correspond to points on one of the row of pixels. Alternatively this could be achieved by applying a mask to the image, which identifies the location of the respective rows. The identified rows are then selectively encoded at step 640.

As part of this process, the processing device 340 can identify second order pixels, which are pixels for example, those to right of the line 702, which could be subject to second order illumination from the diffraction grating. These are then selectively encoded to generate the spectral data, typically by ignoring the signals from one of the sensor channels, typically the lower frequency blue channel sensor. At step 660 reference data, such as metadata is added to the image which is then stored at step 670, as previously described.

Accordingly, it will be appreciated that the above described process can be used in order to store spectral data generated by the spectrometer.

Figure 8:
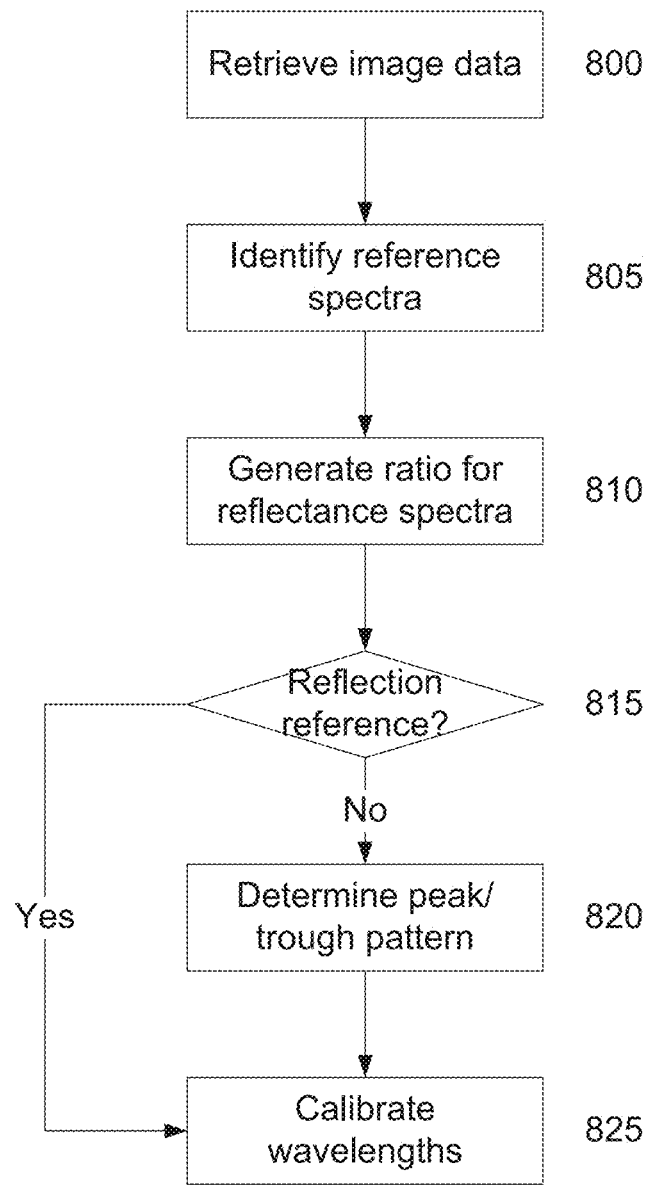
FIG. 8 is a flow chart of an example of a method of processing an image.

An example of the process for processing an image will now be described with reference to FIG. 8.

In this example, at step 800 spectral data is retrieved, with reference and sample spectra being identified at step 810. At this time, background spectra can also optionally be determined as previously described. It will be appreciated that if the image is compressed, the spectral data will correspond to the spectra, whereas if the spectral data corresponds to the entire image, the computer system 430 will typically need to identify pixels corresponding to the spectra using a process similar to that described above with respect to step 630. A ratio of each sample spectra to the reference spectra, optionally modified taking into account the background spectra, is then generated for each sample spectra at step 810, allowing the influence of the illuminating radiation to be accounted for, as will be appreciated by persons skilled in the art.

Following this, at step 820 the computer system 430 determines if a reflection reference is present and if so operates to calibrate wavelengths in the generated ratio spectra at step 825. Otherwise, peak or trough patterns in the reference spectra are identified at step 820, typically by comparing the reference spectra with defined patterns based on the metadata, and with pattern matching being used to assign specific wavelengths to the peaks and troughs, which are then assigned to the reference image at step 825.

Figure 9:
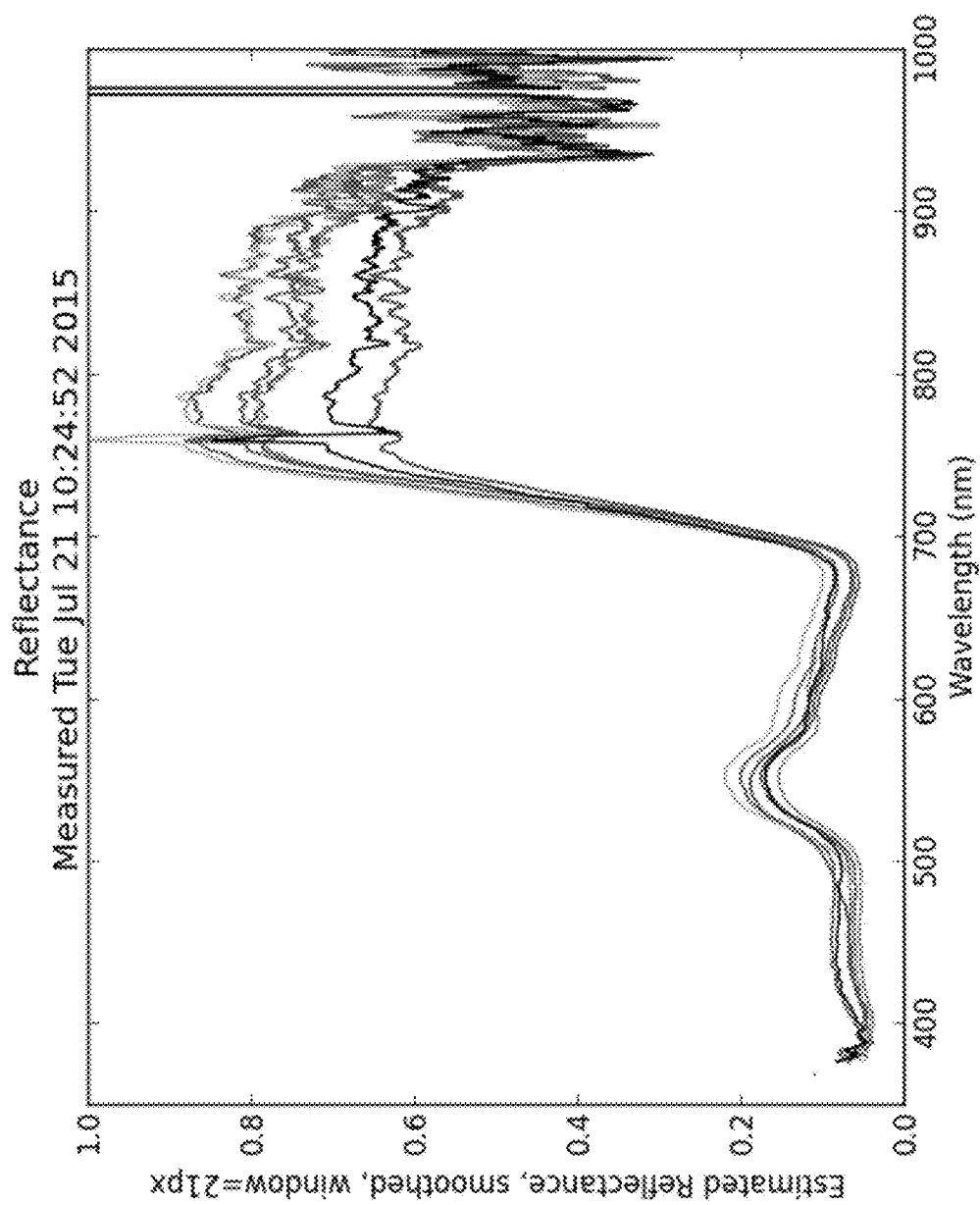
FIG. 9 is a schematic diagram of an example of processed reflectance measurements.

Examples of the resulting ratio spectra are shown in FIG. 9.

Figure 10:
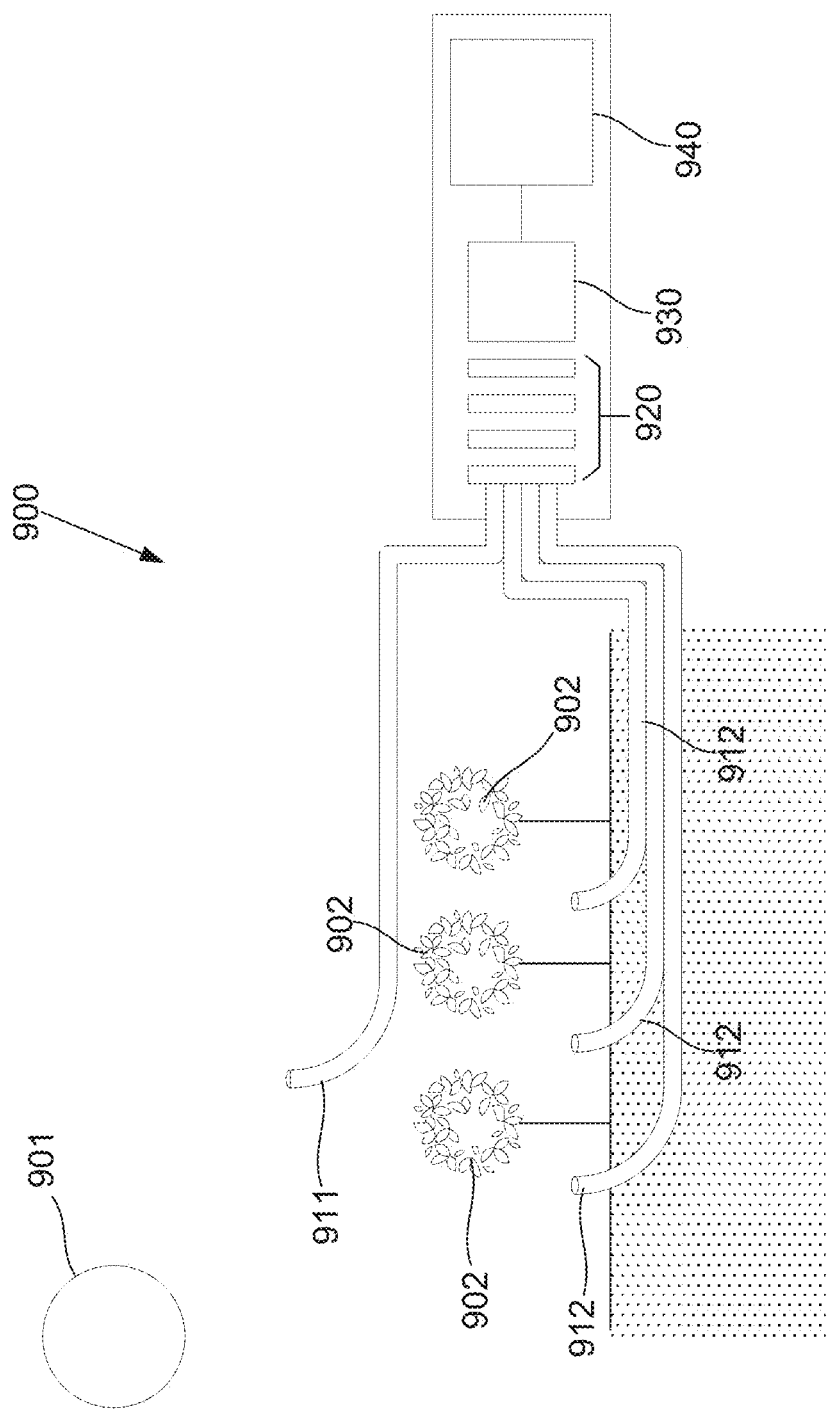
FIG. 10 is a schematic diagram of a further alternative example of an apparatus for measuring spectra from one or more samples.

An alternative apparatus configuration is shown in FIG. 10. In this example, the apparatus is similar to that described above with respect to FIG. 3 albeit it with reference numerals increased by 700.

In this example, the sample optical fibres are provided in a ground surface with ends of the fibres extending upwardly from the surface to thereby collect transmission spectra of light passing through a canopy of plants 902. It will be appreciated that this arrangement allows changes in absorption of illumination by the plants to be identified, but otherwise the apparatus functions largely as described above with respect to the previous examples. It will be appreciated from this that the apparatus can be used in a wide variety of configurations, depending upon the particular application for which the apparatus is to be used.

Accordingly, the above described arrangement provides an apparatus including a flexible optical system for gathering light, an imaging spectrometer, a camera for capturing data, and a computer for calculation of reflectance spectrum.

The flexible optical system consists of a number of optical fibres or an optical fibre bundle, wherein the input end of each fibre gathers light from the scene of interest. The input ends of the fibres may gather light from the source that is illuminating the object of interest, light reflected from the object of interest, or light coming from another direction. The flexible optical fibres allow the inputs to be oriented in different directions and locations as required for the measurement. The optical fibres may gather light directly, through a lens, through an aperture, or through a diffuser, so that the range of angles of incoming light gathered by each of the fibres can be controlled.

In one example, fibre optics consists of only two fibres, one of which gathers light from the sky through a diffuser, and another gathers light reflected from a sample, such as underwater algae, sediments and other suspended material. The sample fibre can be shaded to eliminate specular reflectance from the water surface, allowing this arrangement to be used to measure reflectance from above the water.

In another example, the fibre optics consists of three fibres: one gathering light from the sky through a diffuser, one which looks down at the water surface and gathers light reflected from material below the water surface and specularly reflected from the surface itself, and a third which looks directly at that portion of the sky from which is specularly reflected, allowing the effects of the specular reflectance to be eliminated.

In another example, the fibre optics can be configured to measure reflectance of plants in an agricultural or ecological application. Here again, one fibre gathers diffused light from the sky, and a number of other fibres gather light reflected from plants, soil or other objects on the ground. A white calibrated reflectance target can optionally be placed under one of the fibres to provide an absolute reflectance reference.

The optical fibres typically terminate in a straight line such as a linear optical fibre bundle or linear optical fibre connector, with light from the fibres being incident on an optical system that operates to create individual spectra in an imaging plane of the detector. The optical system typically includes a collimating lens that is positioned one focal length away from the linear row of fibre outputs, to collimate the light emerging from the fibres, a diffraction grating, prism or other dispersive element that separates the light into constituent spectral bands, and an objective lens that focuses the light onto the imaging sensor. The fibre outputs at the spectrometer are arranged in a linear row, which is oriented at a 90° degree angle to the lines on the diffraction grating, to thereby ensure that the angle of diffraction for light from each wavelength band will be the same for light emerging from each of the optical fibres. Light passing from the imaging spectrometer onto the imaging sensor consists of a series of horizontal spectral bands. One band corresponds to each of the fibre outputs in the linear row of fibre outputs. The intensity of the light striking the imaging sensor at any given point corresponds to the intensity of light in a particular wavelength band.

If a diffraction grating is used, some of the pixels in the image plane will receive light from more than one wavelength. This is because diffraction gratings support multiple orders, which are a result of the periodicity of their structure. Therefore, at the position in the imaging sensor where 900 nm light falls, there will also be some intensity of light at 450 nm coming from the second order of the diffraction grating. In order to obtain correct reflectance spectra, the system can be configured to use one of two methods.

In one example, if the imaging sensor used is a color sensor with a Bayer filter, but no infrared blocking filter, and the sensor is a silicon detector, then the sum of signals from all three color bands are used for light in the range 350-650 nm. Then, only the signals from the red Bayer filter are used for wavelengths from 650 nm to 1000 nm. If the red Bayer filter of the color sensor blocks green and blue light sufficiently, then the effect of the second order signals from the diffraction grating will be removed from the near infrared band of the spectrometer optically.

In another example, if the imaging sensor is monochrome, and silicon based so that its sensitivity covers approximately 350-1000 nm, the second order effect from the diffraction grating will be removed by image analysis. Laboratory measurements with calibrated light sources can be used to determine the ratio of light in the second order to the light in the first order for all wavelengths between 350 and 500 nm. Once this is determined, the effect of the second order in diffraction can be removed from the infrared portion of the signal.

The imaging sensor is typically a sensor array such as a CCD or CMOS or infrared sensor. The data from this sensor is sent to a processing system, such as a computer, which is used to analyse the data and determine the spectrum of the object of interest.

In the simplest implementation, one fibre is aimed at the object and reflected light from that object is gathered by the fibre into the spectrometer. A second fibre is placed behind a diffuser to capture the illumination of the region, i.e. the incoming light that falls on the object of interest. This light is also sent into the spectrometer. The reflectance is calculated by calculating the ratio between the reflected light and the illumination light at any given wavelength. This ratio gives the relative reflectivity of the object at each wavelength.

Calculation of the absolute wavelength is performed by multiplying this ratio by a factor to compensate for the loss of the diffuser and other geometrical factors that might affect the reflectance calculation. The precise definition of reflectance depends on a number of geometrical factors related to illumination and the direction of observation, and must be considered in the later stage of data analysis.

In one example, the spectrometer can include a boom that can be suspended over water, plants or minerals, and then moved across a region to map the spectral reflectance. By placing multiple fibres in a row, light from widely separated points many meters or tens of meters apart can be routed into the spectrometer, allowing the reflectance to be measured simultaneously from all of these points. This would replace commercial instruments which would have required multiple individual spectrometers.

Another feature that can be implemented is the addition of illumination, converting the device into an active reflectance measurement system. In one example, a gated light source such as a lamp, LED or laser can be switched by the computer, and is coupled into a second bundle of optical fibres, which lie alongside the first bundle. The light from the lamp then falls on the object of interest, adding artificial illumination. The image sensor and the gated light source are both controlled by the computer, so that data is captured both when the light source is on and when it is off. The computer then calculates the difference, which indicates the spectrum of light that comes from the illumination.

In addition, another fibre monitors the illumination directly, and still another would monitors the ambient illumination. By analysing the data, the reflectance of the object can be determined. In addition, by exciting the object with light of carefully chosen wavelengths, fluorescence from the object may be detected as separate from the reflectance. This implementation provides a multiple point hyperspectral measurement device that measures reflectance and fluorescence from objects.

Additionally, by timing the image acquisition correctly, a flash illumination can also be used to induce time delayed fluorescence, and the camera can capture only the time delayed fluorescence. The device could be operated at night or under a shade to reduce the effects of ambient light. The primary applications for this device using a silicon detector, which detects 400-1000 nm, will be for measurements of water and of plants on land, either outside or in greenhouses.

In another agricultural example, the spectrometer could be mounted in a greenhouse or on a boom carried by a tractor and used to measure the reflectance and/or fluorescence spectra of plants that sit under the fibre inputs, as shown in FIG. 10.

With water bodies, the device could be used to measure the reflectance of water by measuring simultaneously the illumination from the sky and the light reflected from underwater by suspended sediments, algae, blue-green algae, and other pigmented materials.

Figure 11:
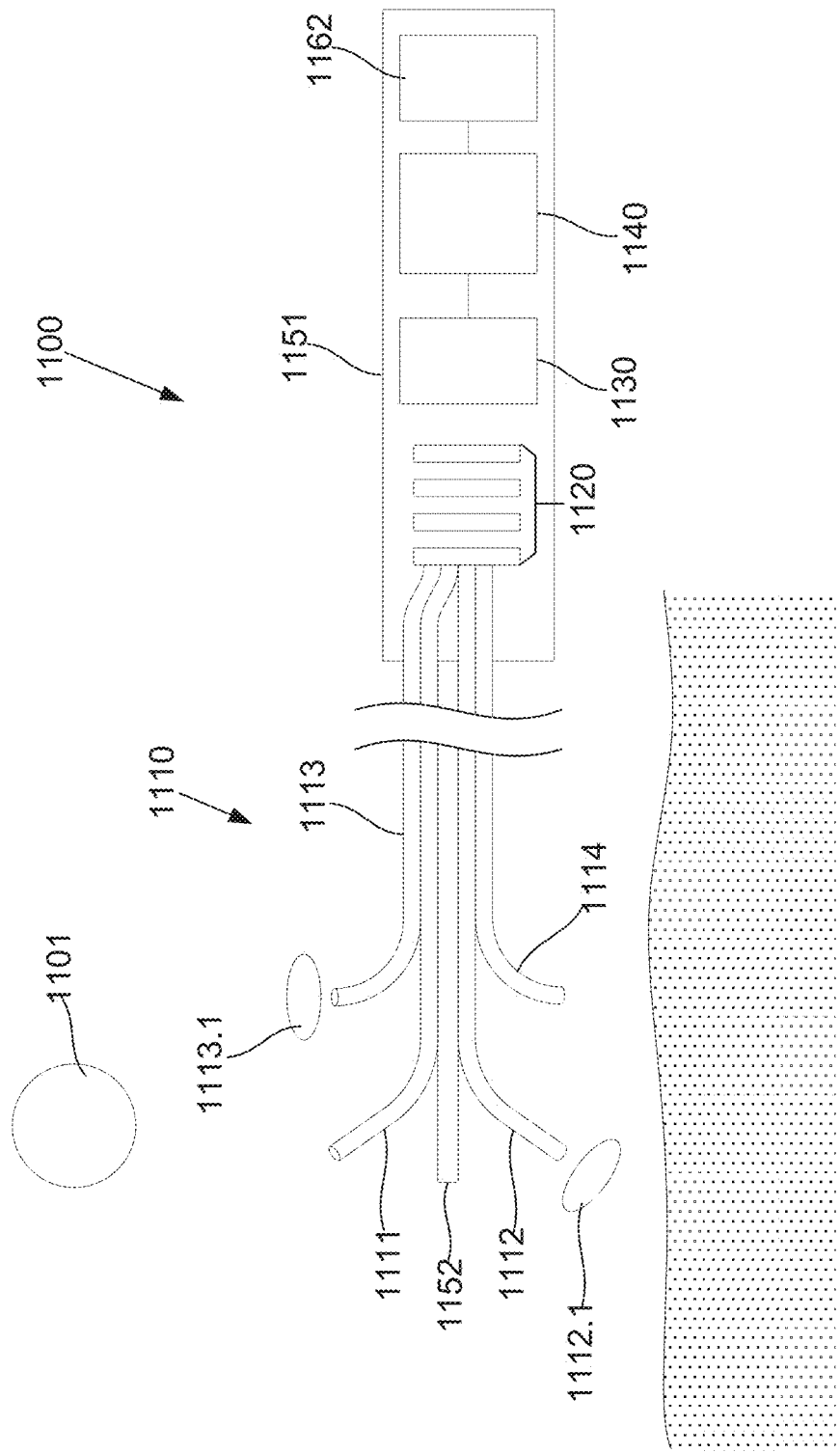
FIG. 11 is a diagram of a further alternative example of an apparatus for measuring spectra from a water body.

An example configuration for water quality monitoring is shown in FIG. 11. In this example, similar reference numerals increased by 800 are used to denote similar features to those described above with respect to FIG. 3.

Accordingly, in this example, in this example, the apparatus 1100 includes a first reference and sample optical fibre pair 1111, 1112 and a second reference and sample optical fibre pair 1113, 1114.

The optical fibres 1111, 1112, 1113, 1114 are mounted on a boom 1152 which extends outwardly from a body 1151. Ends of the optical fibres extend from the boom 1152 allowing radiation to be collected as required. The body can be of any appropriate form, and in one example is formed as a handle allowing the apparatus 1100 to be carried by a user.

However, this is not essential and alternatively the body 1151 could be coupled to or integrated into a device, such as a vehicle, jetty, monitoring buoy, or the like. In either case, the arrangement allows spectra to be collected as the body and boom 1151, 1152 are positioned relative to one or more samples.

The apparatus 1100 includes an optical system 1120, which disburses and focuses radiation onto the detector 1130, which is in turn connected to a processing system 1140, for processing and/or storing spectral data and optionally receiving data from one or more other sensors 1162.

In this example, the four optical fibres 1111, 1112, 1113, 1114 are arranged for two possible methods of reflectance calculation. Optical fibre 1113 captures downwelling light through a diffuser 1113.1, with optical fibre 1114 capturing light reflected from the water. An optional shade (not shown) can be placed around fibre 1114 to eliminate spectral reflection of the sky on the water surface.

Optical fibre 1112 is provided at an angle orientated downwardly relative to the boom 1152 to capture light reflected from the water, whilst optical fibre 1111 is provided at a corresponding angle orientated upwardly to capture light from a part of the sky that is directly reflected from water's surface and into the fibre 1112. This allows for subtraction of the spectral influence of the sky in the reflection from the water, allowing a spectra of the water to be collected. Additionally and/or alternatively, if fibre 1112 is angled at close to Brewster's angle with respect to the water surface, and a polariser 1112.1 is provided in front of the optical fibre 1112 opening with the appropriate polarisation, this specular reflection from the sky can be nearly eliminated when the water surface is calm, removing the need to monitor the signal at optical fibre 1111.

Accordingly, it will be appreciated that this arrangement is particularly suited for water quality monitoring, in particular accounting for reflections from illuminating radiation, and allowing spectra emitted by the water or materials therein to be measured.

The device can also be implemented with imaging sensors in the infrared and in the ultraviolet. The primary application of the device using an infrared sensor would be for minerals identification. By scanning the device across an area of land or across a rock wall, the reflectance spectra of many points across the wall could be calculated and the minerals in the rock face can be classified and identified by application of classification algorithms.

In the examples described above, the apparatus includes a processing system 140 that receives image data from the imaging device and stores spectral data based on the received image data. In addition to simply storing the spectral data, the processing device can be adapted to perform at least some processing of the data, for example to reduce a data volume for storage and/or transmission.

In one example, as previously described, this can simply involve discarding redundant data, such as background parts of an image, or duplicate parts of a spectra, such as by storing only a single line of pixels from each spectra. In another example, further data reduction can be performed by processing the spectra and extracting information therefrom. This dramatically reduces the volume of data in real time within the device, which provides significant benefits when data storage is limited and/or data must be transferred wirelessly over networks of highly limited bandwidth such as mobile phone or satellite communications links.

Figure 12:
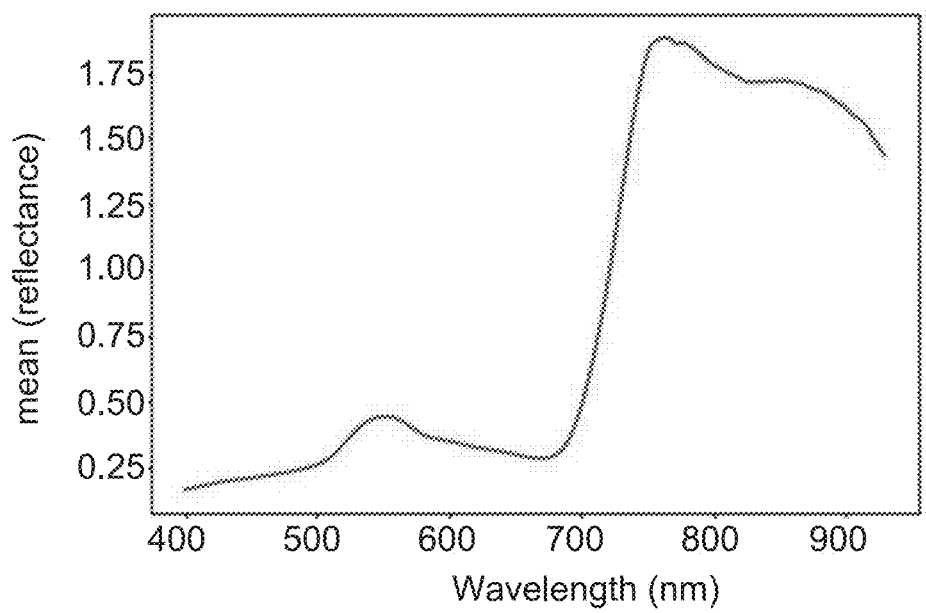
FIG. 12 is a graph showing an example of a mean reflectance for a representative dataset.

Such arrangements are achievable as the illumination spectrum is typically information rich, meaning removing this significantly simplifies the resulting transmission or reflectance spectra. For example, in external environments, illuminating solar radiation is typically highly structured, whereas the reflectance spectra of plants and water bodies tends to be relatively smooth and can usually be represented by a greatly reduced number of parameters. An example mean reflectance spectra, with the illuminating radiation removed, is shown in FIG. 12.

Figure 13:
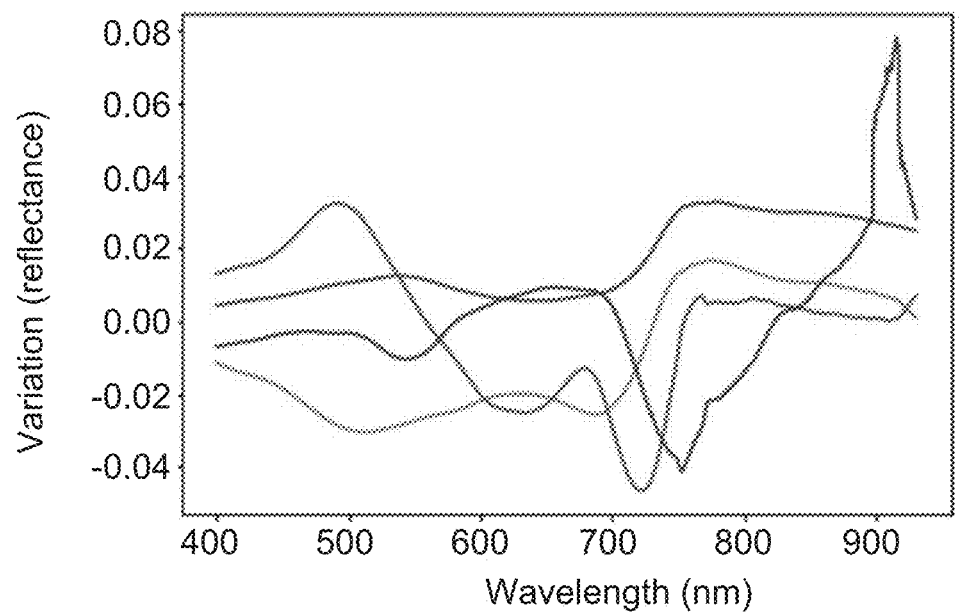
FIG. 13 is a graph showing an example of principal components used to reduce the reflectance data.

In one example, such spectra can be analysed using a processing technique, such as Principle Component Analysis (PCA), which can be used to return the mean value for each wavelength from the dataset, in addition to returning the 'principal components', which are an ordered set of vectors that can be used in a linear combination to represent the original data to good approximation. Examples of these vectors are shown in FIG. 13.

In order to maximise the effectiveness of this approach, the processing system can be loaded with a previously determined set of mean reflectance and principal component vectors, calculated from a representative prior dataset in a similar environment. Then, for each reflectance measurement, the device would reduce the reflectance, represented by a vector whose length equals the number of wavelength bins (typically one for each pixel across the image sensor).

Figure 14:
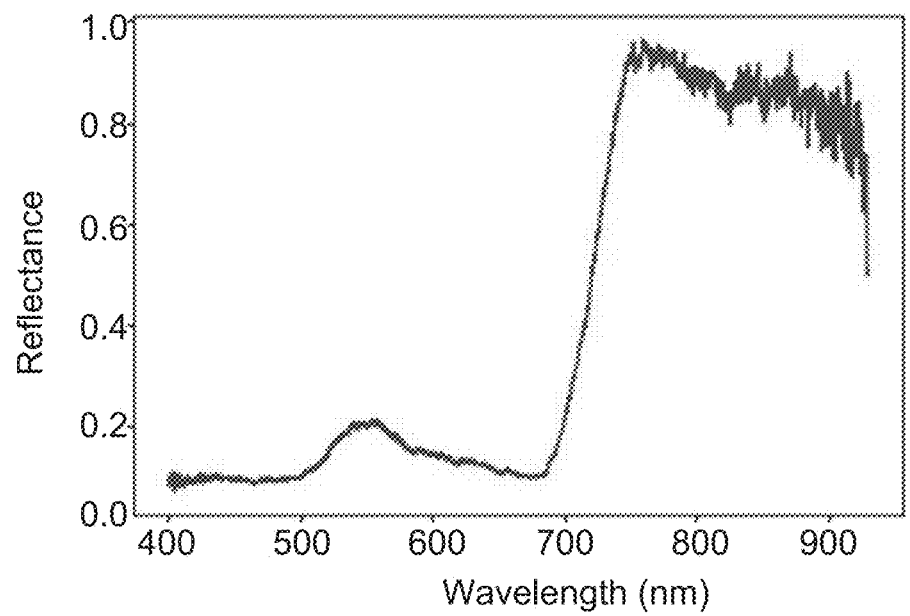
FIG. 14 is a graph showing an example of raw reflectance data.

By way of example, the reflectance spectra shown in FIG. 14 includes 2649 floating point values. The spectra was then analysed using principal component vectors using two possible methods.

The first method involves subtracting the mean value from the sampled reflectance data, and then calculate the dot product of each of the result and the principal component vectors shown in FIG. 10 with the raw reflectance data. This results in 10 coefficients which represent the reflectance spectrum to very good approximation, but occupy only $1/265$ of the data occupied by the reflectance data itself.

The second method involves subtracting the mean value, and then calculating the coefficients by some optimisation method such as general linear least squares (GLS) which represent the weights of each principal component which most accurately reconstruct the reflectance data when multiplied by the principal components.

Figure 15:
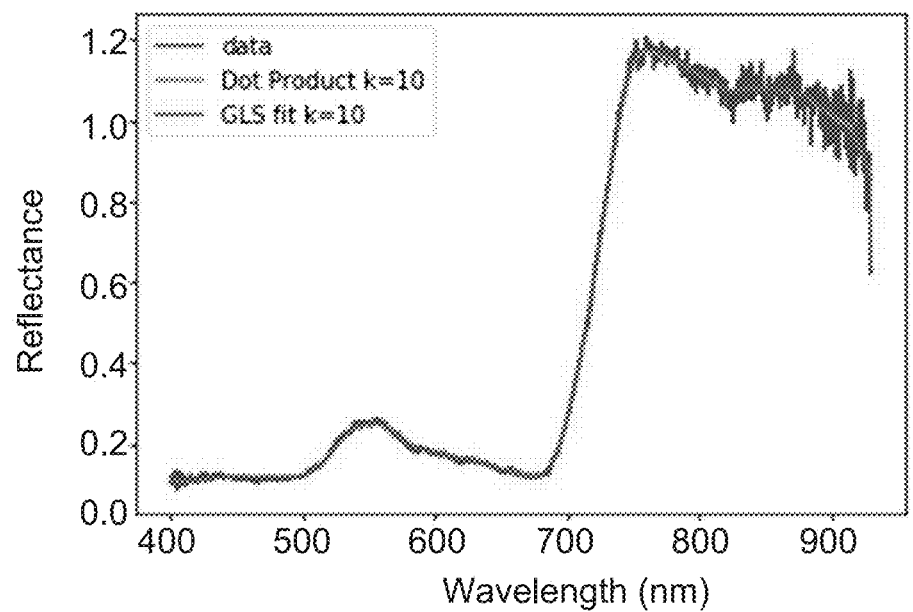
FIG. 15 is a graph showing an example of a comparison between reduced datasets based on the raw reflectance data of FIG. 14.

FIG. 15 shows a comparison between these methods. Both reduce the 2649 data points to only 10 values and so perform the same data reduction. However, the GLS method performs slightly better in accuracy, although it requires in this example approximately 4 times the computer time to perform.

The values of these 10 coefficients can be rapidly returned to another device via wireless device or used to make rapid decisions in real time, such as decisions around application of pesticide, fertiliser or activation of a weed control device in the case of agricultural application. In the case of water quality monitoring these coefficients can be used to generate alerts to inform users about the current state of the water body.

Accordingly, the above described arrangement provides an imaging spectrometer specifically designed for performing measurements of samples. The system typically includes a flexible optical system for gathering light, including a number of fibre optic cables, arranged to collect radiation reflected from or transmitted through samples, as well as an optical fibre for collecting illuminating radiation. The system also includes an imaging device for capturing the sample and illuminating radiation, and optionally a computer for calculation of reflectance and/or transmission spectra. An optional source of illumination may also be provided if required.

The spectrometer determines the reflectance spectrum of any object in its field of view by gathering light reflected from the objects, gathering the incoming illumination onto the object, and optionally gathering light from other directions in order to properly account and correct for specular reflectances.

The system uses an optical system to directly link the optical fibres to the image sensor, allowing simultaneous capture of light spectra from the samples and the illuminating radiation. This ensures that light gathered from the samples and the illuminating radiation are imaged using the same optical system and the same image sensor, thereby reducing the issues associated with traditional system.

In contrast, traditional arrangements typically require a separate spectrometer for each of the illuminating radiation and the samples, with all the spectrometers being used simultaneously to capture the required spectral data. However, this has the disadvantage that one must implement several separate spectrometers and detectors, and that differences in the calibrations, exposure times, sensitivities and thermal drifts will all affect the accuracy of the measurements. When performing reflectance measurements, this raises the cost and adds dramatically to the number of parameters that must be measured and compensated for to ensure that the spectral sensitivity, losses and efficiencies in each of the spectrometers are either matched or compensated for in calibration.

Other traditional arrangements employ a single spectrometer and optical switching mechanisms (to reduce the cost and calibration issues). However, these implementations do not allow for simultaneous, instantaneous measurement from multiple detectors and suffer from the difficulty of calibrating/matching sensor information taken at slightly different times.

Traditional arrangements are also not typically suitable for mobile applications. Both of these multiple and single/gated spectrometer implementations have a complexity of calibration, validations, and quality control that is far more complicated than the above described system.

In some traditional arrangements, a slit imaging spectral camera is used to calculate reflectance by deploying a calibrated reflective (white) target within the field of view of the camera, and the reflectance is calculated as the ratio between the reflected light from the object of interest and the light reflected from the calibration target. However, this requires mounting of the calibration target in the field of view, and requires additional optics required to achieve an imaging spectrometer with objective lens rather than optical fibres. In addition, all of the light gathered by such a hyperspectral camera must come from the same direction. The system described here has the advantage that optical fibres can be positioned in any position and at any angle with no compromise or complexity to the optical system.

In the current system, light from all sources of interest is fed through a single imaging spectrometer, onto a single imaging sensor. Because of this, any changes in efficiency, exposure time, sensitivity, thermal drift in the imaging sensor's efficiency are removed by calculating ratios of intensity between the various spectral bands. In addition, any overall background signal in the imaging sensor is removed uniformly from all of the spectral bands. Therefore these effects need not be monitored or verified. In addition, these parameters may vary between different devices, but they will still all return the same reflectance data when measuring the reflectance spectra of the same objects. This lowers the cost of manufacture of the device dramatically. The capacity of the device is only limited by the number of fibres and the total resolution of the imaging sensor, so for example, the system could be scaled to allow simultaneous capture of full spectrum signals from 100 to 200 individual optical fibres.

Thus the combination of utilising optical fibres to gather light, an imaging spectrometer to separate light into spectral bands, and a single imaging sensor to capture the data, enables the system to produce high quality reflectance spectra at a very low fraction of the cost (likely less than 10%) of competing commercial systems.

As previously discussed, one of the benefits of the above described arrangement is the ability to avoid issues associated with sensor drift or error.

In this regard, traditional devices suffer from a primary weakness that when used to monitor the reflectance of an object by simultaneously monitoring the incoming light from several directions, these must either use multiple point spectrometers and combine data from them to calculate reflectance, or use a single point spectrometer and switch rapidly between a number of fibre inputs with a fibre switch.

Both of these options raise the cost of the system dramatically, making commercial implementation of this method of measuring spectral reflectance prohibitively expensive for most potential markets.

In case of multiple point spectrometers, the cost rises dramatically because if there is any difference in wavelength, background signal, or sensitivity between the several point spectrometers used to make the measurement, this difference (which may drift in time, and most certainly will drift with temperature) this will cause large systematic errors in the reflectance values that are calculated.

In the case of rapid switching, a fibre switch that is fast enough to compete with above described technique, and hence is capable of switching more than 50 times per second, is not available which can cover the wavelength range of interest. Fibre optic switches based on mechanical switching at substantially lower speeds are available, such as the MPM-2000 switches sold by Ocean Optics, which cost over US $10000, and switches based on MEMS technology can reach very high speeds but with much poorer insertion loss specifications and much narrower wavelength range (2.6 dB in the case of the Thorlabs OSW8108, which operates only from 1240 to 1610 nm), and costs over US $8000. Thus even getting by with a much lower switching speed raises the cost dramatically.

Furthermore, any temporal drift in the incoming illumination (such as the flicker from indoor lighting, clouds or shadows) will cause an error in reflectance calculation since the light coming from each fibre is measured at different times by the single spectrometer.

As a result, the market offers few alternatives to the system described in this specification, which are intended for use in collecting reflectance/transmission spectra from multiple samples by imaging the samples and the illuminating radiation simultaneously.

Whilst hyperspectral cameras could be used to capture the spectra of a fibre optic bundle, there are tightly specified for a variety of applications, making them impractical as the basis for a low-cost commercial sensor system.

Low-cost point spectrometers are available for agricultural research, which in combination (i.e. combining up-facing and down-facing spectrometers) could capture the same data for reflectance calculations as the system in this specification. However these spectrometers typically cost several times the cost of the system described herein, and would perform substantially worse due to issues discussed previously, such as sensor drift, difference in errors and responsiveness of the sensors, or the like.

For example, the specifications of a commercial system in the form of Apogee's FieldSpec spectroradiometer are as listed in table 1 below.

TABLE 1

| | |
|---|---|
| Wavelength Range | 340 to 820 nm |
| Wavelength Resolution. | 3.0 nm (full width half maximum) |
| Analog to Digital Resolution. | 14 bit |
| Signal to Noise Ratio. | 1500:1 (at maximum signal) |
| Dark Noise. | ≤3 counts |
| Linearity. | Less than 1% or 0.5% |
| Measurement Sensitivity | Greater than 10% of max sensitivity for wavelengths greater than 380 nm |
| Measurement Repeatability. | Less than 1.0% (wavelengths greater than 400 nm) |
| Operating Environment. | −20 to 70 C, 0 to 100% relative humidity |
| Temperature Response. | −0.1 ± 0.1% per ° C. |
| Irradiance Calibration Uncertainty. | ±5% |

On the basis of these specifications, it would be impossible for the commercial device to provide an instrument that meets the performance of the imaging spectrometer of the invention (hereinafter referred to generally as the "imaging spectrometer"), as will now be described.

Figure 16:
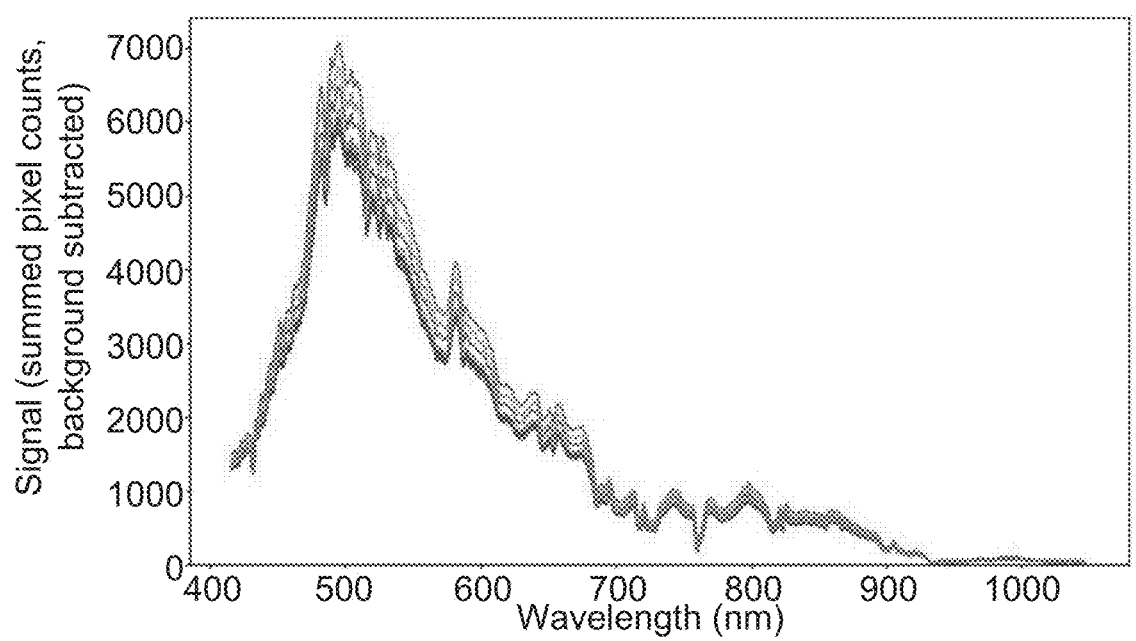
FIG. 16 is a graph showing an example of the solar spectrum captured through subsequent measurements separated by approximately half a second.
Figure 17:
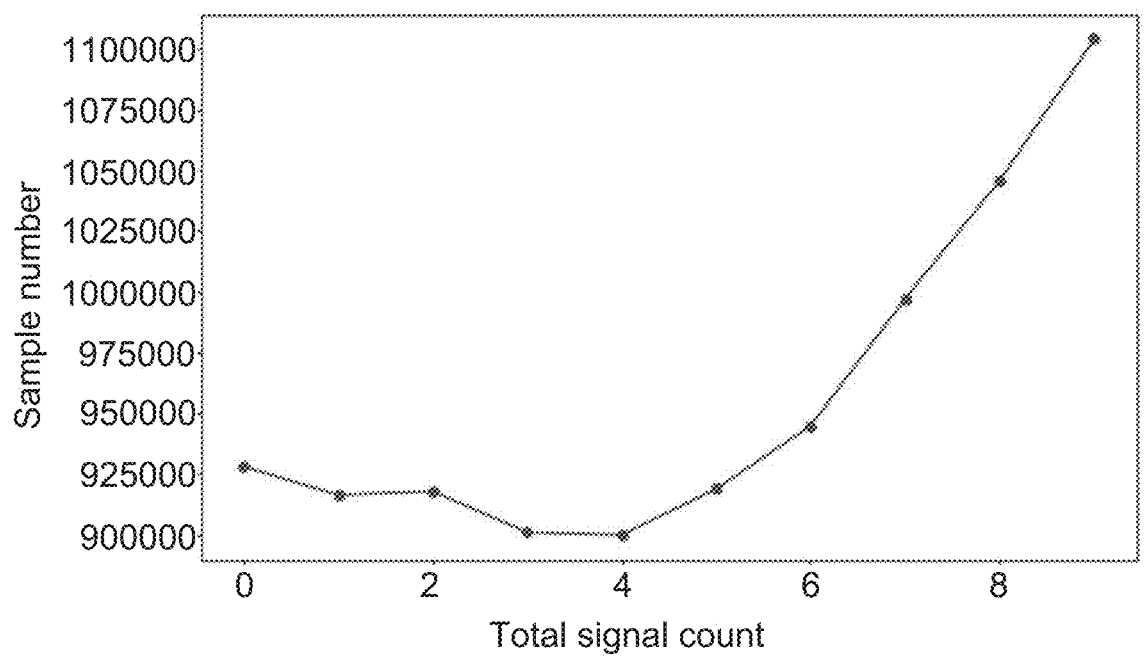
FIG. 17 is a graph showing the short term drift in exposure time exhibited by a low cost CMOS sensor.

In terms of sensitivity, the imaging spectrometer can use a low-cost sensor to capture a number of measurements of the incident solar radiation. By way of example, 10 sequential solar spectrum measurements were captured at a frequency of approximately 2 Hz, with the results being shown in FIG. 16. The sensor's exposure time is subject to small fluctuations due to data buffering and potentially other effects, even when it is programmed to maintain a fixed exposure time. In this example, this variation in the actual sensor exposure produces an apparent variation in the overall light level of up to 21% of the total. This variation is easier to see in FIG. 17, which shows the summed signal for each of the spectra in FIG. 16, plotted in sequence according to the time at which they were taken.

If a single reference signal were used to calculate the reflectance for each of these 10 measurements, the variation in exposure level of 21% would cause an error in overall reflectance calculated of 21%. However, by capturing all of the incoming light with an imaging spectrometer, we eliminate this discrepancy; the linearity of the sensitivity across the CMOS array is typically substantially less than the pixel noise, and so is of no consequence in practical measurements.

If the Apogee instrument were used to capture this signal, the specification shows that the individual spectrometers can be expected to vary in irradiance calibration by 5%. As a result, one may expect an arrangement of such spectrometers to deliver reflectance values that vary by up to ~%10, even for a single measurement, since each reflectance signal is composed of 2 spectral measurements.

A further benefit of using the imaging spectrometer to monitor multiple signals is that background noise levels can be continuously monitored.

In this regard, there is always some drift and variation in background signal level over time for low cost sensors that affects the accuracy of reflectance measurements. In order to capture reliable reflectance measurements with spectrometers where the signals are similar in strength to the background signals (which are dominated by dark currents in the CMOS sensors), it is especially critical to correctly estimate the background contribution to the raw signal data.

When using multiple point spectrometers, the background level must be kept stable enough that it does not drift between measurements. This is especially problematic since background signal levels are known to vary dramatically with sensor temperature. In order to manage this effect, many point spectrometers must be either actively thermally stabilised, or else background levels must be monitored often enough to allow one to compensate for their changes. Measuring this background signal level requires some mechanical shutter to block incoming light when the background level is measured, adding complication to the instrument. Most often such background levels are simply assumed not to drift and ignored, leading to systematic errors.

Figures 18, 19:
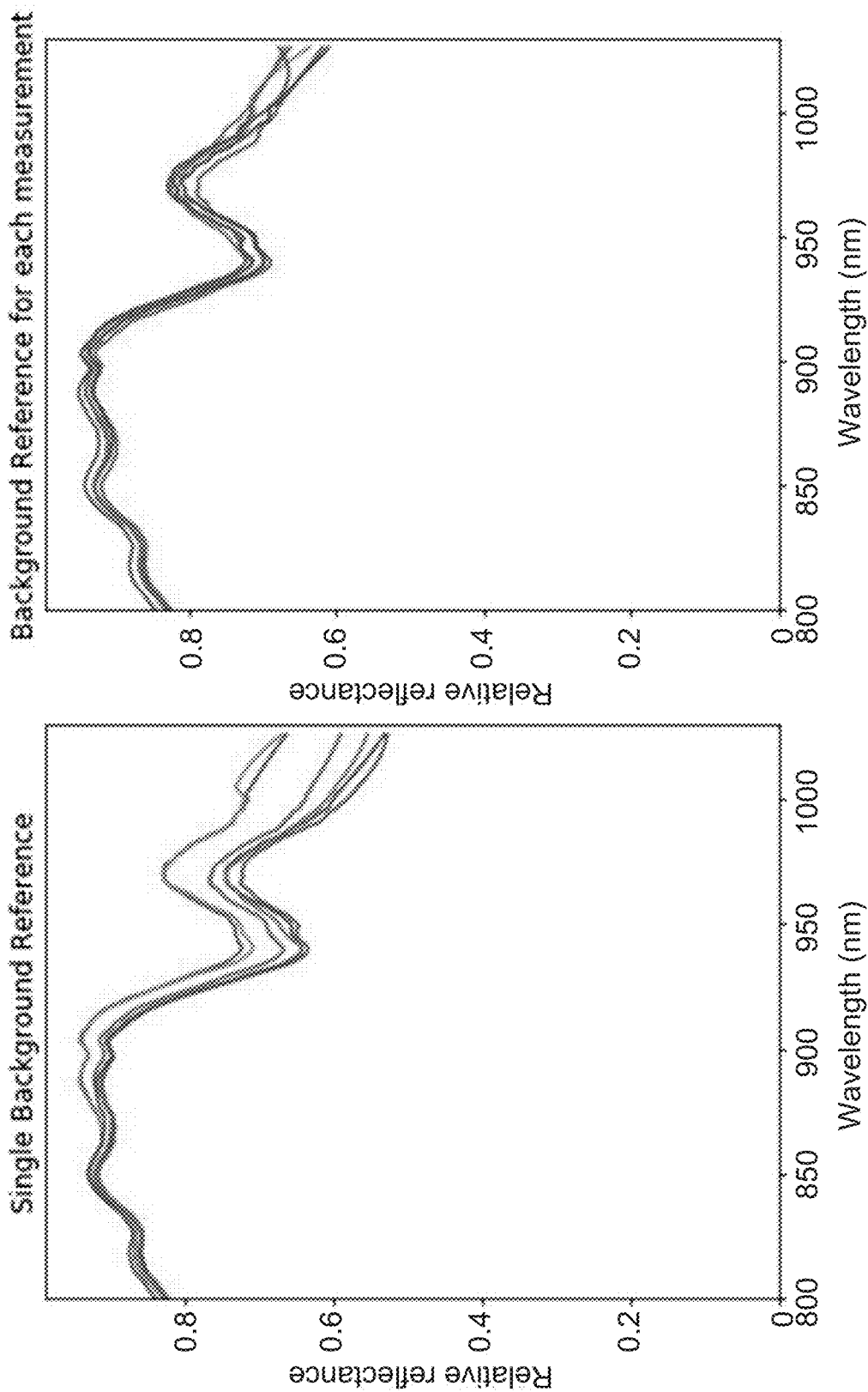
FIG. 18 is a graph showing an example of calculated reflectance signals with a background signal based on an assumption of a fixed background value.
FIG. 19 is a graph showing an example of calculated reflectance signals with a measured background signal.

The advantage of the use of the area CMOS sensor in the imaging spectrometer allows for monitoring the background signal of the sensor in real time, concurrently with spectra acquisition, by monitoring the background signal of pixels which are not exposed to light. In FIGS. 18 and 19, a comparison is shown between two calculated reflectance signals based on the same raw data. In FIG. 18, multiple reflectance spectra from a target are collected over a time period, with the spectra being calculated based on the assumption that background noise signals in the sensor do not change in time, whereas in FIG. 19 background pixel values captured from the same images as the signals are used to correct for noise. In this case, an area of the CMOS array exactly the same in size and shape that is displaced from the region where the signals are captured was used to calculate the background values. It is clear from FIG. 19 that in this case, performing background subtraction on each individual image substantially reduces the variation between the calculated reflectance. Since these data were taken with a fixed sensor and sample, this is what we expect if the background subtraction is done correctly.

Figure 21:
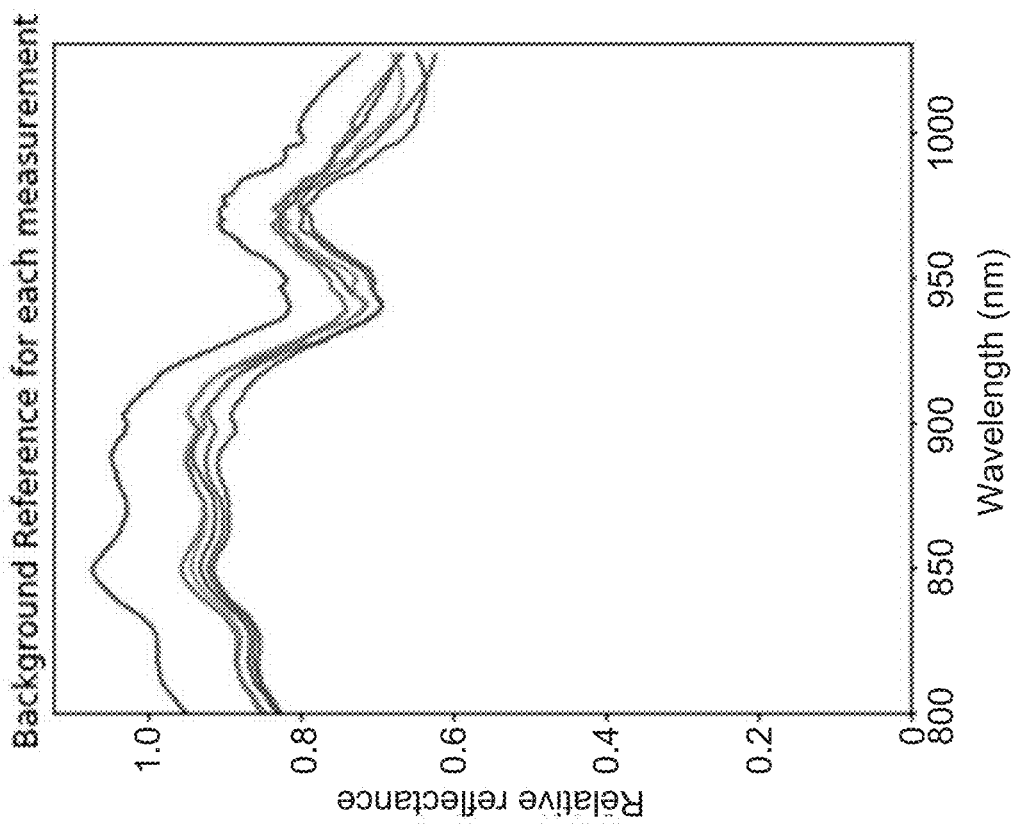
FIG. 21 is a graph showing an example of calculated reflectance signals with a measured background signal with a varying exposure.
Figure 20:
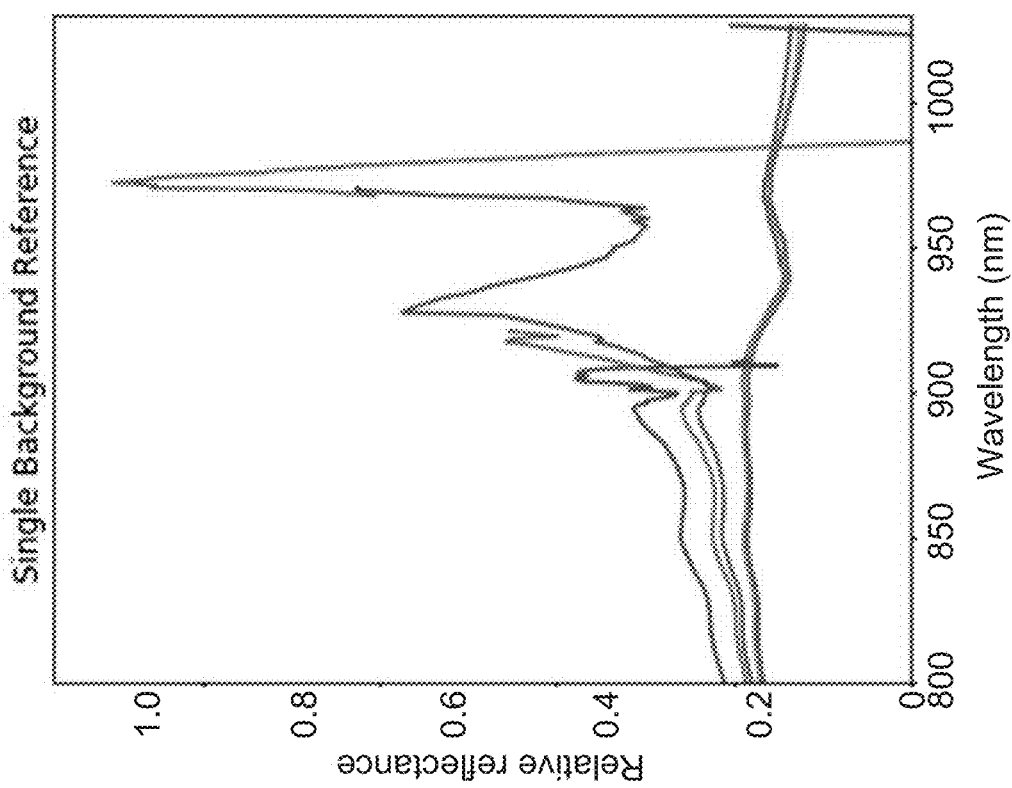
FIG. 20 is a graph showing an example of calculated reflectance signals with a background signal based on an assumption of a fixed background value with a varying exposure.

This advantage is more dramatically demonstrated in FIGS. 20 and 21, where different exposure values are programmed into the CMOS sensor while looking at the same target. In the example of FIG. 20, a constant correction is applied, whereas in FIG. 21 a correct based on the actual exposure, as determined from background pixels in each image is used. In this regard, a change in the sensor exposure time causes the background of the image to change. Correctly compensating for this with a point spectrometer would require re-measuring the background signal every time the exposure was changed, requiring, again, a mechanical shutter and additional measurements. By using the dark pixels in the image frame of the imaging spectrometer, it is possible can monitor this changing background and provide much more reliable measurements of reflectance even when the exposure time is changed.

Consequently if a single background level is used, the resulting reflectance calculation becomes almost useless, since the background level changes substantially with the exposure time, whereas reflectance spectra calculated based on each captured frame in the dataset leads to much more reliable outcome.

Figure 22:
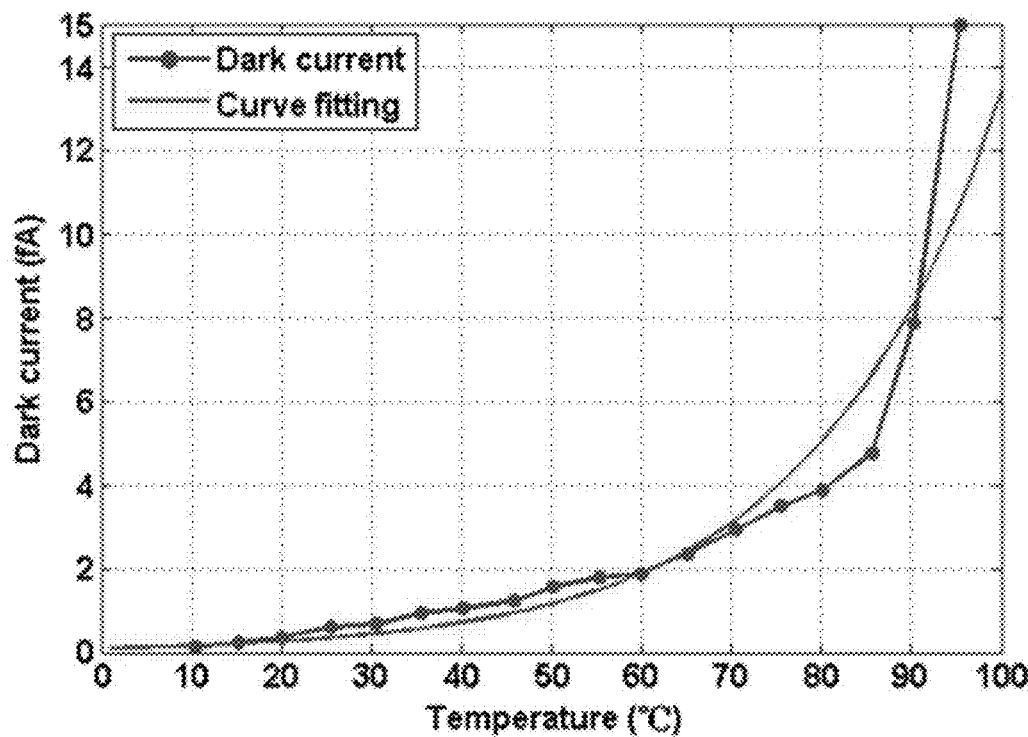
FIG. 22 is a graph showing an example of change in dark current with temperature for an example sensor.

A further impact on measurement reliability results from variations in temperature. In this regard, in many field measurement situations the temperatures of the sensors can easily vary between 0° C. and 50° C., for example resulting from direct sunlight on an enclosed sensor housing, which can lead to rapid temperature increases. The temperature primarily affects the dark current and sensitivity of CMOS sensors. When using multiple point spectrometers, any difference in temperature between them would result in a systematic error in calculated reflectance. This effect was measured and is shown in FIG. 22. As seen in the figure, the dark current of a sensor can increase by more than a factor of 5 within the range in which outdoor sensors must be reliable, i.e. at least between 0° C. and 50° C. As comparison, the background variation that caused the systematic errors in reflectance shown in FIGS. 22 and 23 was less than 50%.

Figure 23:
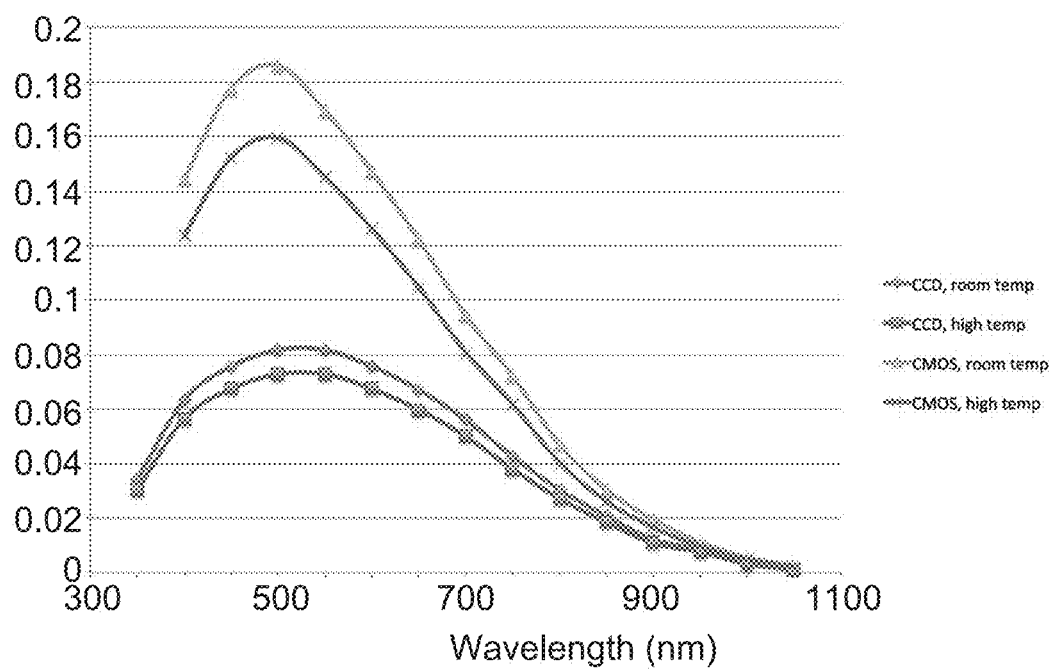
FIG. 23 is a graph showing an example of changes in sensitivity with temperature changes for a number of different example sensors.

FIG. 23 shows that the temperature also affects the sensitivity of CMOS sensors. This would hamper any method of simultaneously capturing spectral signals from two separately mounted spectrometers in the field, where the temperatures could be substantially different. Even after the spectrometers are calibrated for relative sensitivity, any differential drift in temperature between the two devices would result in a systematic error in calculated reflectance spectra.

Another potential source of systematic error in reflectance measurements is the variation in illumination. When multiple point spectrometers are used to capture data, the data capture must be synchronised in time to ensure that the illumination is the same for the incoming and reflected light signals. This adds challenges in either hardware triggering or very precise time tagging of the spectral data captured. In the case of hyperspectral cameras, the situation is much worse, since typically the incoming illumination is only measured occasionally by placing a reference target in the camera's field of view. Where illumination is artificial it can flicker at 100 Hz or more, necessitating either very long integration times or very precise hardware triggering of the spectral instruments.

The imaging spectrometer however removes any need to resort to such precise timing, and makes it possible to capture reliable reflectance data even with rapidly changing illumination, since the spectra captured from incoming and reflected light are always captured simultaneously by the same imaging sensor.

Figure 24:
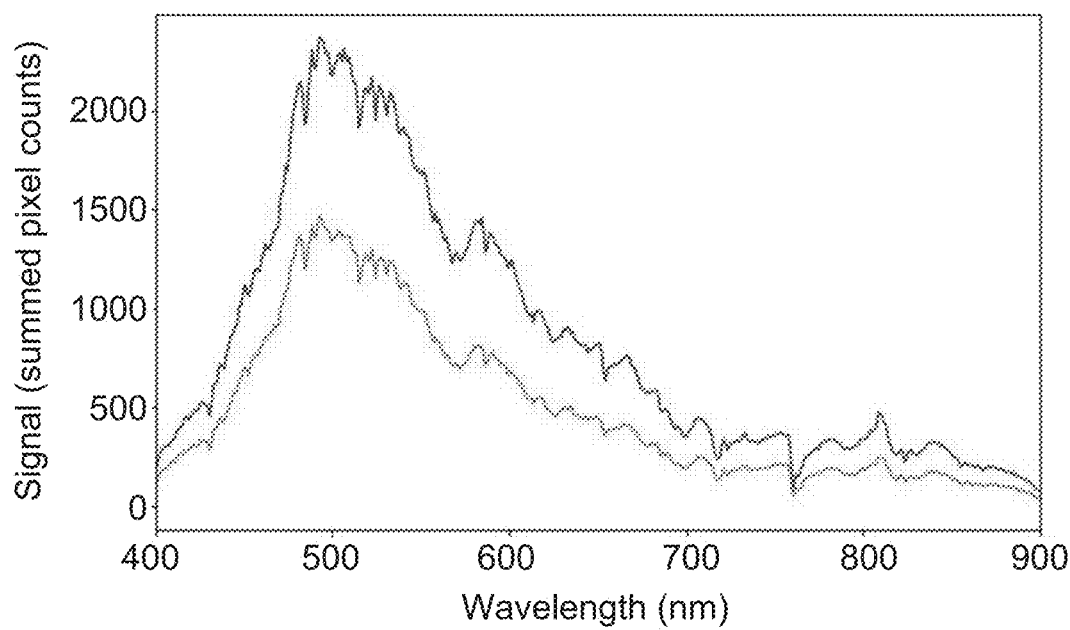
FIG. 24 is a graph showing an example of a comparison of a downwelling spectral signal captured at the start and end of a dataset.
Figure 25:
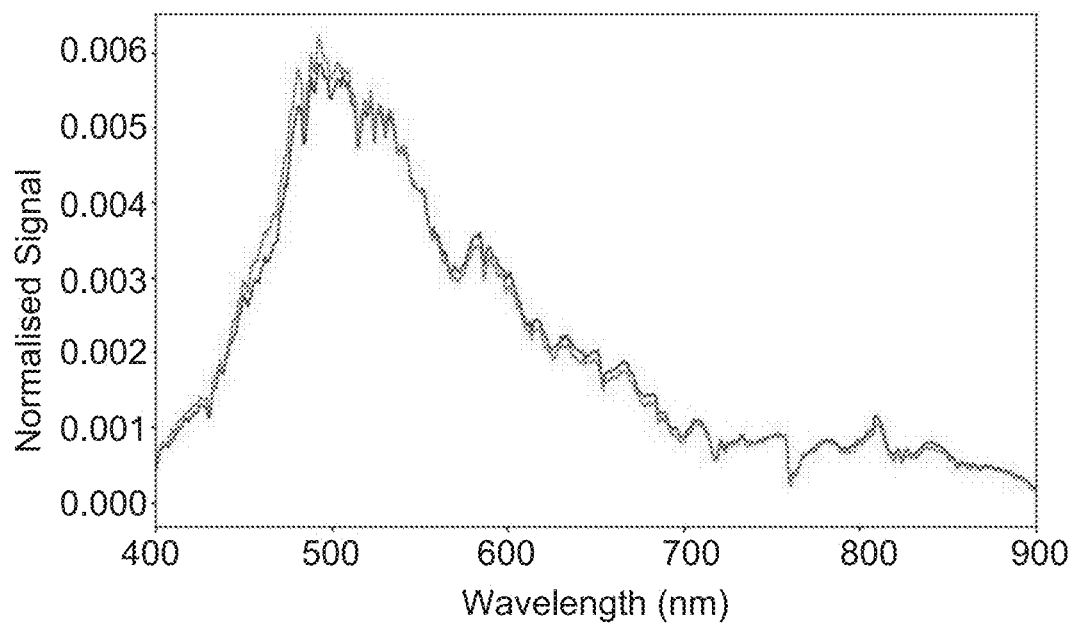
FIG. 25 is a graph showing an example of signals of FIG. 24 after normalisation.

FIGS. 24 to 27 show an example of the influence of changing illumination in a dataset. As shown in FIG. 24 the illumination changes significantly, not only in intensity but in spectral distribution, since overhead conditions (presence of cloud cover) change both. Even if an overall 'fudge factor' is used to compensate for the change in intensity of illumination as shown in FIG. 25, the spectrum of the natural illumination can change by as much as 10% within a few minutes, meaning complete compensation for intensity changes cannot be achieved.

Figure 26:
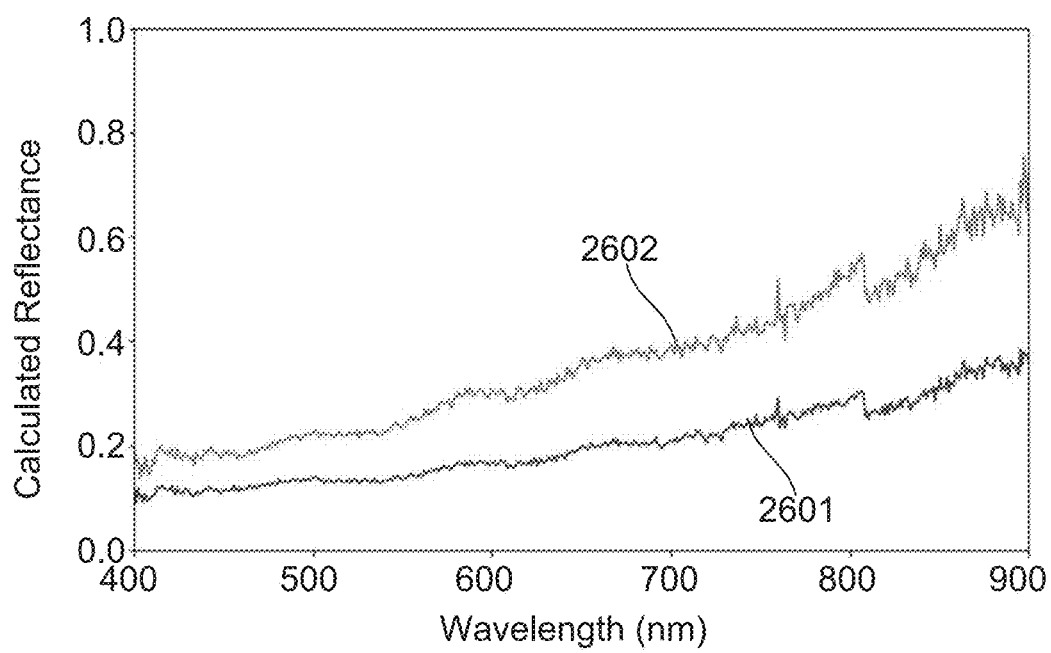
FIG. 26 is a graph showing an example of a comparison of calculated reflectance signals using a reference downwelling spectral signal captured at the start of or during the dataset.
Figure 27:
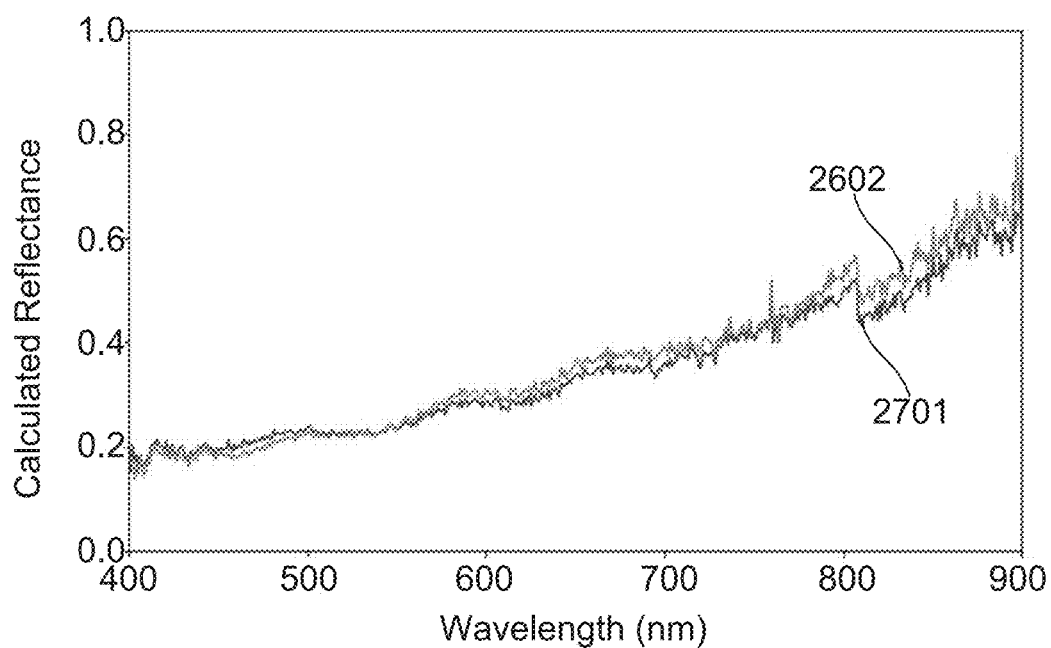
FIG. 27 is a graph showing an example of signals of FIG. 26 after normalisation of the reference signals.

The influence of the level and spectral distribution of the illumination is shown in FIGS. 26 and 27. FIG. 26 a comparison of calculated reflectance is shown using either the reference downwelling curve taken at the start of the dataset 2601, or the downwelling curve captured simultaneously with the upwelling data 2602. The absolute change in illumination causes a drastic change in apparent illumination.

Similarly, in FIG. 27 a comparison of the reflectance calculation as in FIG. 26 is performed, but with the reference downwelling data 2701 rescaled by normalisation as in FIG. 25 and compared to the downwelling curve 2602. The remaining difference in calculated reflectance seen here is a result of the change in illumination, which would appear as a systematic error if data were taken using a calibration target only occasionally during the data taking.

Accordingly, the common practice of calibrating hyperspectral data using a reference target at the start or end of a dataset is clearly unreliable unless the solar illumination is absolutely constant, hence the insistence of many researchers on taking hyperspectral data only on entirely cloud-free days. The imaging spectrometer circumvents this problem, allowing data taking under a much wider variety of conditions.

Very low cost spectrometers also suffer from some drift and variation in wavelength scale from one device to the next, which is problematic when using a multiple spectrometer solution approach. The imaging spectrometer provides a strategy to avoid the requirement that wavelength calibration of the device remain stable for long times, and that the wavelength scales of each of the input signals is shared in common.

Figure 28:
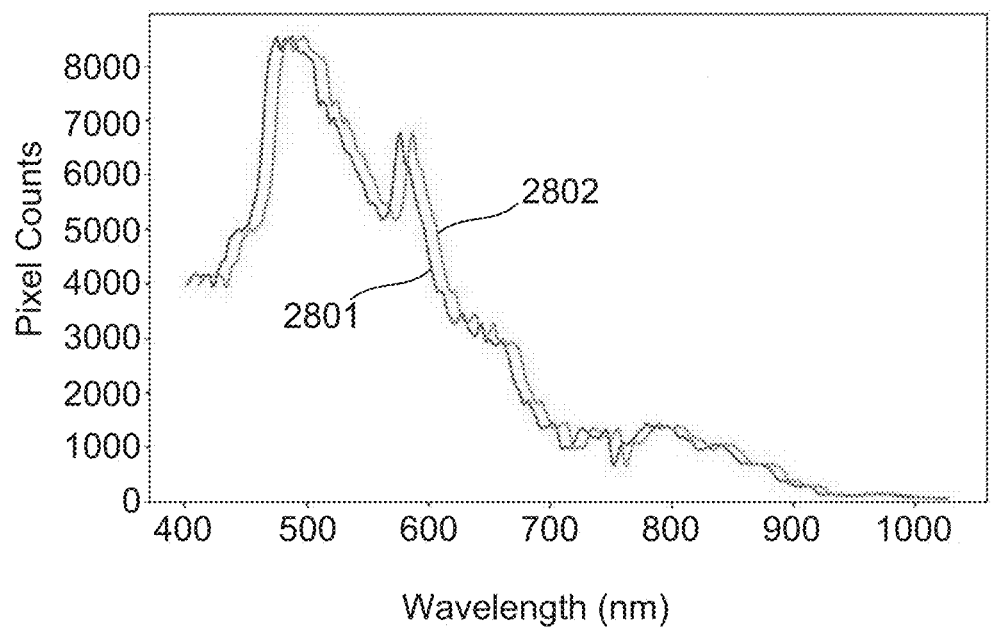
FIG. 28 is a graph showing an example of a comparison of a difference in wavelength when downwelling light is captured compared to reflected light; and, FIG. 29 is a graph showing an example of the effect of a drift in wavelength calibration.
Figure 29:
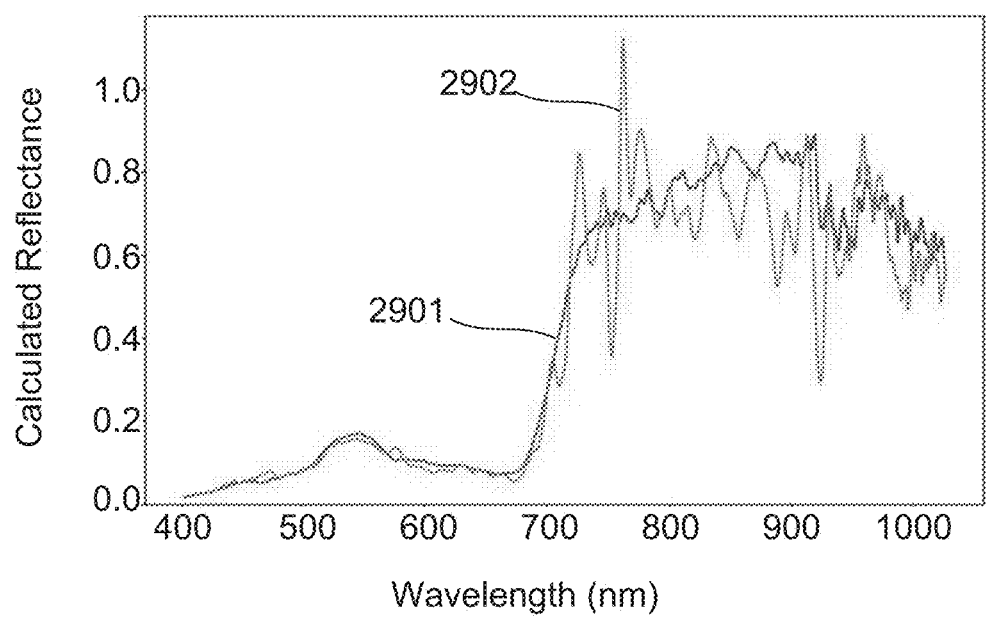

If separate spectrometers were used with different wavelength calibrations, and their outputs are used to calculate reflectance, the errors in wavelength scales can cause very large spikes in the calculated reflectance spectrum due to these wavelength scale differences. FIG. 28 shows an example of this problem, highlighting that if wavelength calibration is different by 10 nm, when downwelling light is captured than when reflected light is captured, shown as 2802, compared to 2801, this will result in a systematic shift in the captured spectrum. In FIG. 29, the result of such a drift in wavelength calibration (in time, if the same spectrometer is used for both downwelling reference and to capture reflected light, or due to some drift not shared between two separate spectrometers used to capture both signals simultaneously) is shown, with the result of the correct calibration shown at 2901 and the incorrect calibration at 2902. This demonstrates that the reflectance signal will be wildly in error as shown. Thus maintaining a strict wavelength calibration between all measurements is critical to making reliable reflectance measurements.

The imaging spectrometer manages this problem by guaranteeing that the wavelength scale is shared between all the incoming signals.

Drifts or differences in wavelength scale as large as 50 nm have been observed in making practical measurements using low-cost materials and optics. Using existing market spectrometers, with either multiple spectrometers or switching arrangements, wavelength calibration drifts or differences must be kept below the spectral resolution. For the example commercial spectrometer described above, this drift would have to remain well below 3 nm (the resolution of the instrument) in order to avoid the artefacts seen in FIG. 29. In contrast the imaging spectrometer described herein results in a correctly calculated reflectance signal, but with an overall, unknown shift in the wavelength.

This remaining overall wavelength shift can be readily removed by post-processing of the reference spectrum where the lighting source is highly structured, such as sunlight (where we find many sharp absorption lines), or indoor artificial lighting (where most lights emit sharp emission lines).

Accordingly the above described imaging spectrometer provides an arrangement that can allow cheap sensing and optic arrangements to be used, whilst accommodating significant sources of errors, including one or more of exposure variability, noise, wavelength or sensitivity drift, time or temperature dependent drift, changes in illumination, or the like. This solution is achieved by using multiple waveguides to collect radiation from multiple sources, including illuminating radiation and one or more samples exposed to the illuminating radiation, simultaneously, using a single 2D image sensor.

This approach allows compensation mechanisms to be applied to captured reflection/transmission spectra, including subtraction of background noise and illuminating radiation, thereby removing the effects of the errors outlined above, allowing accurate spectra to be measured using cheap equipment.

Thus, this allows reliable spectra to be collected even when the wavelength scale and calibration cannot be reliably set or maintained to better than 50 nm. This dramatically reduces required specifications of the device in wavelength calibration as compared to market devices.

The above described arrangement has broad applications in multiple research and production areas, including but not limited to environment monitoring, agricultural production and value-chain monitoring for agriculture, food and pharmaceutical products. The device can also be used in conjunction with active artificial light sources to determine reflectance at specific wavelengths, i.e. for detection of specific compounds and characteristics and for monitoring of potential photosynthetic rate in photosynthesising organisms.

The system can be applied at multiple scales and be integrated into other optical devices (microscopes, cameras, telescopes) using different fibres and lenses to gather light from different distances (micro to ground vehicles (such as tractors), to aerial vehicles to satellite).

Example applications include:
Water Quality Monitoring:
Reflectance spectra of water bodies
Detection of water colour
Detection of suspended solids
Detection of algae
Detection of bacteria
Detection of blue-green algae
Detection of aquatic macrophytic vegetation
Detection of bottom sediments
Agriculture:
Soil quality monitoring including moisture monitoring
Forest monitoring
Aquaculture monitoring
Weed detection and plant identification
Measurement of reflectance spectrum of crops
Estimation of absorption spectrum of crops and light transmission
Plant health (drought, heat, frost stress and nutrient toxicity/deficiency)
Plant disease measurement
Plant and plant product (vegetable, fruit, nut, fibre etc) monitoring in field and post-processing conditions
Fraction of ground cover measurement; inference of plant canopy structure
Estimation of quantity and quality of standing leaf area and biomass
In commercial production, this device can be integrated into spraying and fertilising machinery for ameliorating weeds, disease, nutrition and water status
In plant research where light is used to estimate plant characteristics e.g. estimation of plant photosynthetic capacity by combining detector with controllable light source wavelengths
Environmental Monitoring:
Identification of plant species
Identification of invasive plant species
Soil measurements—chemical and physical composition
Mineral/rock analysis
Food and Pharmaceutical Value-Chain Monitoring:
Determination of food chemical contents of food and pharmaceuticals
Monitoring quality and chemical content across the entire value-chain (raw product to production line to market)
Mining/Geology:
Mineral identification Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. Apparatus for measuring spectra from one or more samples, the apparatus including:
   a) a reference waveguide that receives illuminating radiation used to illuminate at least one sample, wherein the illuminating radiation is at least one of:
      i) natural light;
      ii) solar radiation; and,
      iii) a non-artificial source of illumination;
   b) at least one sample waveguide that receives sample radiation at least one of reflected from and transmitted through a respective sample;
   c) an optical system that:
      i) spatially distributes radiation from each of the waveguides based on a frequency of the radiation; and,
      ii) focuses radiation from the optical fibres into an imaging plane; and,
   d) an imaging device including a sensor that captures an image of the focused and spatially distributed radiation from the imaging plane so that the image includes respective spectra from each of the waveguides.

2. Apparatus according to claim 1, wherein the optical system:
   a) spatially distributes radiation from each waveguide in a first direction based on the frequency of the radiation; and,
   b) focuses radiation from the waveguides so that the radiation from each fibre is spaced in a second direction perpendicular to the first direction.

3. Apparatus according to claim 1, wherein at least one of:
   a) the waveguides are optical fibres;
   b) the optical system includes a slit and collimating lens and wherein output ends of the waveguides direct radiation through the slit and collimating lens
   c) the optical system includes:
      i) diffraction grating that spatially distributes radiation; and,
      ii) one or more lenses that focus the spatially distributed radiation;
   d) the imaging device includes at least one of:
      i) a CMOS;
      ii) an infrared sensor;
      iii) a single pixel sensor; and,
      iv) a CCD sensor
   e) the apparatus includes a diffusion member at an input to the reference waveguide.

4. Apparatus according to claim 1, wherein an input end of the sample fibres includes at least one of:
   a) an input lens for focusing radiation from the sample;
   b) an input lens having at least one of:
      i) a focal length of at least one of:
         (1) 1 cm to 100 cm;
         (2) 5 cm to 50 cm; and,
         (3) 10 cm to 30 cm; and,
      ii) a field of view of at least one of
         (1) 1 cm2 to 10 cm2; and,
         (2) 2 cm2 to 5 cm2; and,
   c) a polariser for selectively filtering radiation from the sample.

5. Apparatus according to claim 1, wherein the apparatus includes at least one of:
   a) a second reference fibre that receives reference radiation from at least one of:
      i) a reference target;
      ii) a reference sample; and,
      iii) a reference illumination source; and,
   b) a reference illumination source adapted to generate illumination including particular frequencies of radiation.

6. Apparatus according to claim 1, wherein the apparatus includes a support for supporting input ends of at least some of the waveguides and wherein at least one of:
   a) the input ends of at least some of the waveguides are movably mounted to the support, thereby allowing a relative field of view of the waveguide to be adjusted; and,
   b) wherein the support includes a boom, and wherein at least some of the sample waveguide inputs are spaced along the boom allowing reflected radiation to be received from a number of spatially distributed samples simultaneously.

7. Apparatus according to claim 6, wherein the boom at least one of:
   a) is coupled to a handle allowing a user to carry the boom, and thereby manually position the waveguides relative to one or more samples; and,
   b) extends laterally from a vehicle.

8. Apparatus according to claim 1, wherein the apparatus is adapted for measuring spectra from a water body and includes at least one of:
   a) a pair of waveguides including:
      i) a reference waveguide arranged to capture downwelling light through a diffuser; and,
      ii) a sample waveguide capturing light reflected from the water body; and,
   b) a pair of waveguides including:
      i) a sample waveguide provided at an angle orientated downwardly to capture light reflected from the water body; and,
      ii) a reference waveguide provided at a corresponding angle orientated upwardly to capture light from a part of the sky that is directly reflected from the water body onto the sample waveguide.

9. Apparatus according to claim 1, wherein at least one of:
   a) the sensor is aligned with the imaging plane;
   b) the sensor receives radiation from at least one reflector aligned with the imaging plane;
   c) the apparatus includes a modulator for selectively transferring radiation from the imaging plane to the imaging device; and,
   d) the apparatus includes a modulator including at least one of a linear digital mirror device and a liquid crystal on silicon device.

10. Apparatus according to claim 1, wherein the apparatus includes at least one processing device that includes a processor or other logic implementation and that:
   a) receives image data from the imaging device; and,
   b) generates spectral data by:
      i) identifying one or more rows of pixels within the image data, the one or more rows of pixels being indicative of radiation from the waveguides; and,
      ii) selectively encoding the one or more rows of pixels to form the spectral data;
   c) at least one of:
      i) stores spectral data based on the received image data;
      ii) stores spectral data together with reference data collected from one or more sensors; and,
      iii) transmits spectral data based on the received image data.

11. Apparatus according to claim 10, wherein the at least one processing device generates spectral data by:
   a) identifying one or more second order pixels within the image data based on a pixel location within the image; and,
   b) selectively encoding channels associated with the one or more second order pixels to form the spectral data, wherein the at least one processing device selectively encodes the second order pixels using at least one of
      i) a red channel in which red pixels are at least partially sensitive to infrared light;
      ii) a red and a green channel in which red and green pixels are at least partially sensitive to infrared light;
      iii) an infrared channel; and,
      iv) signals from a red Bayer filter channel for radiation wavelengths from 650 nm to 1000 nm.

12. Apparatus according to claim 10, wherein the at least one processing device:
   a) generates the spectral data by performing principle component analysis on the received image data to determine principle component coefficients; and,
   b) transmits spectral data in the form of the principle component coefficients and wherein the at least one processing device is populated with principle components based on the nature of the sample to be analysed.

13. Apparatus according to claim 1, wherein the apparatus includes at least one processing device that includes a processor or other logic implementation and that receives image data from the imaging device and at least one of:
   a) determines a sample spectra for each sample by determining a ratio of the sample radiation and the illuminating radiation; and,
   b) performs a wavelength calibration of the sample spectra by at least one of:
      i) identifying a known combination of frequencies in the illuminating radiation;
      ii) identifying a known frequency in a reference spectra measured from a reference sample; and,
      iii) identifying a known frequency in illuminating radiation from a reference illuminating source.

14. Apparatus according to claim 1, wherein the apparatus includes at least one processing device that includes a processor or other logic implementation and that:
   a) receives image data from the imaging device;
   b) determines a background spectra from the spectral data, wherein the background spectra is determined by identifying background pixels based on a defined location in the image data; and,
   c) uses the background spectra to determine the sample spectra.

15. Apparatus according to claim 1, wherein
the reference waveguide has an input directed at least one of:
   a) upwardly;
   b) skywards;
   c) towards a natural illumination source; and,
   d) towards a non-artificial illumination source.

16. Apparatus according to claim 1, wherein the apparatus includes at least one processing device that includes a processor or other logic implementation and that processes the sample radiation to compensate for sources of errors, wherein the sources of errors include at least one of:
   a) exposure variability;
   b) sensor noise;
   c) sensor wavelength drift;
   d) sensor sensitivity drift;
   e) time dependent drift;
   f) temperature dependent drift; and,
   g) changes in illuminating radiation.

17. Apparatus according to claim 1, wherein the apparatus uses an imaging device having at least one of:
   a) a temperature response coefficient selected from the group including:
      i) greater than ±0.1% per ° C.;
      ii) greater than ±0.5% per ° C.; and,
      iii) greater than ±1% per ° C.;
   b) a maximum drift in background current over the range 0° C. to 80° C. selected from the group including:
      i) greater than 10%;
      ii) greater than 50%;
      iii) greater than 200%; and,
      iv) greater than 500%;
   c) a maximum drift in measurement sensitivity over the range 0° C. to 80° C. selected from the group including:
      i) less than 20%; and,
      ii) less than 10%;
   d) a wavelength drift over the range 0° C. to 80° C., over a period of 1 year, selected from the group including:
      i) greater than 3 nm;
      ii) greater than 5 nm;
      iii) greater than 10 nm; and,
      iv) up to 50 nm;
   e) a linearity over the range 0° C. to 80° C. selected from the group including:
      i) greater than 1%;
      ii) greater than 2%; and,
      iii) greater than 5%; and,
   f) a signal to noise ratio selected from the group including:
      i) less than 2000:1;
      ii) less than 1000:1;
      iii) less than 500:1; and,
      iv) less than 100:1.

18. Apparatus according to claim 1, wherein the apparatus senses radiation in at least one of:
   a) 350 nm-1000 nm;
   b) 350 nm-750 nm;
   c) 350 nm-650 nm;
   d) 400 nm-700 nm;
   e) 650 nm-1000 nm;
   f) 10 nm-380 nm;
   g) 750 nm-1400 nm; and,
   h) 1400 nm-5500 nm.

19. Apparatus according to claim 1, wherein the apparatus is configured for use in at least one of:
   a) water quality monitoring:
   b) agriculture monitoring;
   c) environmental monitoring;
   d) food monitoring;
   e) pharmaceutical monitoring;
   f) geological monitoring; and,
   g) mine monitoring.

20. A method of measuring spectra from one or more samples, the method including:
   a) using a reference waveguide to receive illuminating radiation used to illuminate at least one sample, wherein the illuminating radiation is at least one of:
      i) natural light;
      ii) solar radiation; and,
      iii) a non-artificial source of illumination;
   b) using at least one sample waveguide to receive sample radiation at least one of reflected from and transmitted through a respective sample;
   c) using an optical system to:
      i) spatially distribute radiation from each of the waveguides based on a frequency of the radiation; and,
      ii) focus radiation from the optical fibres into an imaging plane; and,
   d) using an imaging device including a sensor to capture an image of the focused and spatially distributed radiation from the imaging plane so that the image includes respective spectra from each of the waveguides.

* * * * *